United States Patent
Nugent et al.

(10) Patent No.: US 10,237,609 B2
(45) Date of Patent: Mar. 19, 2019

(54) METHODS AND SYSTEMS FOR DELIVERY OF COMPLIANT VIDEO ADVERTISEMENTS TO DEVICES FROM ONE OR MORE PLATFORMS

(71) Applicant: VIDillion, Inc., Las Vegas, NV (US)

(72) Inventors: Dennis M. Nugent, Las Vegas, NV (US); Dan Lovy, Concord, MA (US); Mario Hebert, Austin, TX (US)

(73) Assignee: Vidillion, Inc., Las Vegas, NV (US)

( * ) Notice: Subject to any disclaimer, the term of this patent is extended or adjusted under 35 U.S.C. 154(b) by 541 days.

(21) Appl. No.: 13/800,876

(22) Filed: Mar. 13, 2013

(65) Prior Publication Data

US 2013/0268963 A1    Oct. 10, 2013

Related U.S. Application Data

(60) Provisional application No. 61/619,292, filed on Apr. 2, 2012, provisional application No. 61/719,914, filed on Oct. 29, 2012.

(51) Int. Cl.

| | |
|---|---|
| *H04N 21/24* | (2011.01) |
| *H04N 21/81* | (2011.01) |
| *H04N 21/258* | (2011.01) |
| *H04N 21/262* | (2011.01) |
| *H04N 21/435* | (2011.01) |
| *H04N 21/472* | (2011.01) |
| *H04N 21/643* | (2011.01) |

(52) U.S. Cl.
CPC ....... *H04N 21/435* (2013.01); *H04N 21/2407* (2013.01); *H04N 21/25833* (2013.01); *H04N 21/26258* (2013.01); *H04N 21/643* (2013.01); *H04N 21/812* (2013.01); *H04N 21/47202* (2013.01)

(58) Field of Classification Search
CPC .................................................... H04N 21/435
See application file for complete search history.

(56) References Cited

U.S. PATENT DOCUMENTS

| 6,490,591 B1 * | 12/2002 | Denbar et al. | |
| 2010/0281534 A1 * | 11/2010 | Poder et al. | 726/15 |
| 2011/0145858 A1 * | 6/2011 | Philpott et al. | 725/32 |
| 2012/0173342 A1 * | 7/2012 | Rajaopadhye | G06Q 30/0272 705/14.68 |

OTHER PUBLICATIONS

IAB, "Digital Video Ad Serving Template (VAST)", Version 2.0, Nov. 2009.*

* cited by examiner

*Primary Examiner* — James R Marandi

(74) *Attorney, Agent, or Firm* — EIP US LLP

(57) ABSTRACT

A method of delivering video content. The method may comprise receiving a request for a first video from a video-playing device that is coupled to a network, determining whether to include a second video, generating a playlist comprising the first video and the second video, and transmitting the playlist to the Internet video-playing device. The second video may comprise a video advertisement. Additionally, a system for delivering video content is described. The system may include a processor, storage, an operating system, a logging module, one or more network interfaces capable of communicating with a plurality of video advertising networks, and a scripting engine.

20 Claims, 19 Drawing Sheets

US 10,237,609 B2

METHODS AND SYSTEMS FOR DELIVERY OF COMPLIANT VIDEO ADVERTISEMENTS TO DEVICES FROM ONE OR MORE PLATFORMS

CROSS REFERENCE

This application claims the benefit of U.S. Provisional Application No. 61/619,292 filed on Apr. 2, 2012 and U.S. Provisional Application No. 61/719,914, filed on Oct. 29, 2012, both of which are incorporated herein by reference in their entirety.

BACKGROUND

The accessibility and consumption of video content over the Internet has grown exponentially in recent years. As a result, more and more users have shifted to watching or accessing video content on and through Internet-connected devices capable of reaching a variety of video content resources spread throughout the world. In connection with this shift of viewing habits to accessing Internet-based video content, video content providers have sought to help monetize and support such video delivery by incorporating video-based advertisements into and around the video content requested by users.

Video content providers would like to know whether a particular video served to a user over the Internet is actually received or watched by the user in its entirety. The ability for users to skip or fast-forward past certain videos, or certain portions of videos, means that content providers may know only whether a particular video is requested, but not whether it is actually received or watched by the user. Additionally, many devices do not have the requisite software (player, web kit, browser, etc) to initiate or respond to request from internet servers delivering and/or logging requests and responses. Such uncertainty as to whether videos are actually watched by the requesting user may limit the desirability or incentive for many video content producers to make their video content accessible over the Internet. For example, advertisers may desire to include a short video advertisement around certain highly-requested videos. However, some devices that stream interne video, including but not limited to first generation set top boxes (STBs) may not provide sufficient levels of communication to the advertisers that their advertisements are actually received and watched by users.

Lacking such communication ability, many advertisers refuse to distribute their advertisements to those devices in connection with online video content.

As a result, there is a need to provide better information to video advertisers regarding delivery of their video content, including advertising content, through Internet-connected devices. Before the Digital Video Ad Serving Template (VAST), there was not a common in-stream advertising protocol for video players, which made scalable distribution of ads impossible for ad servers. In order to serve ads to multiple publishers using disparate proprietary video players, ad-serving organizations had to develop slightly different ad responses for every publisher/video player targeted. This approach was expensive and did not easily scale. Additionally, the ad servers could not receive a response from many devices indicating that the ad had been played.

INCORPORATION BY REFERENCE

All publications, patents, and patent applications mentioned in this specification are hereby incorporated by reference to the same extent as if each individual publication, patent, or patent application was specifically and individually indicated to be incorporated by reference.

DETAILED DESCRIPTION

Figure 1:
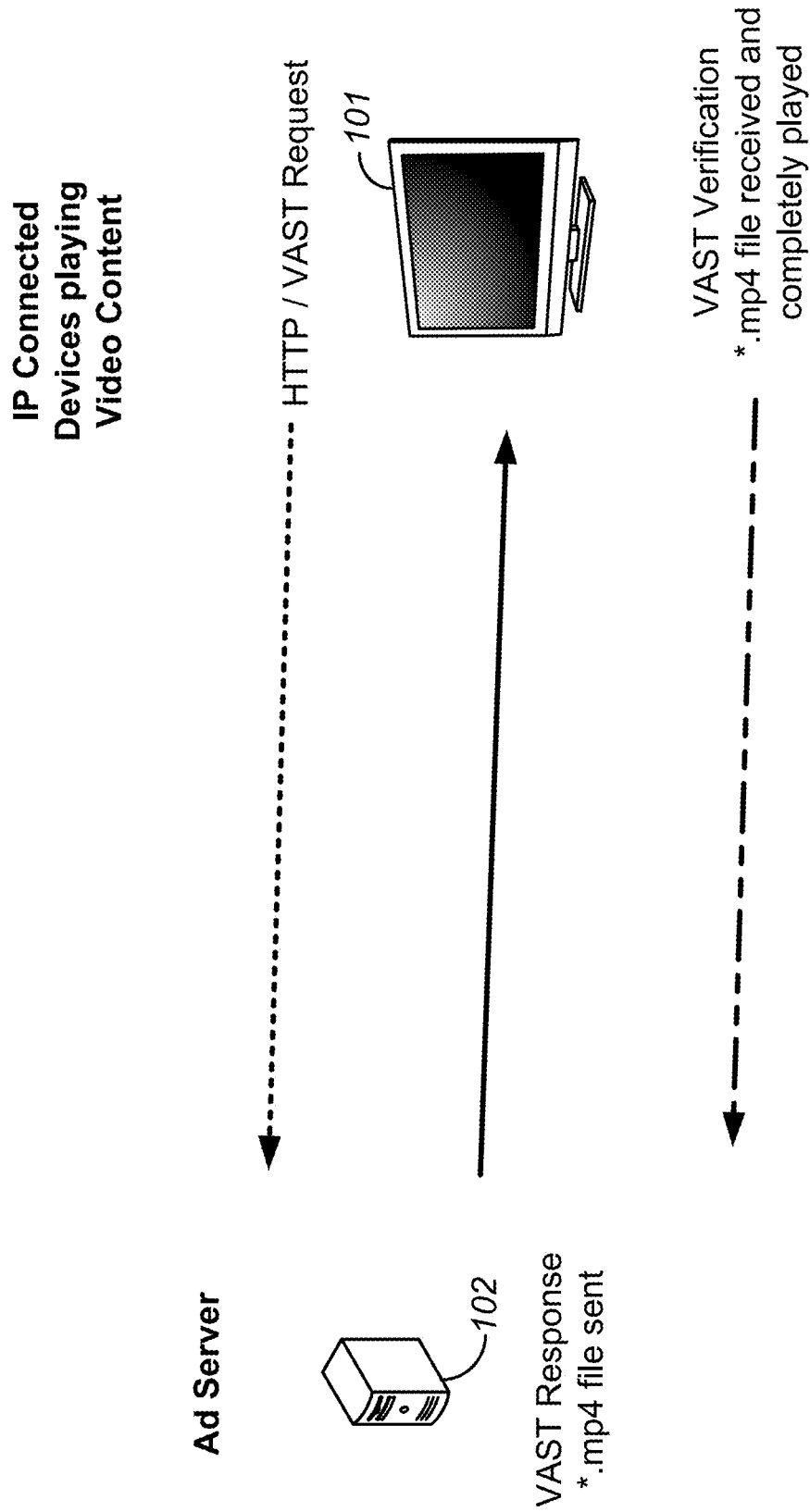
FIG. 1 is a block diagram illustrating various components of a system configured to provide request, response, and verification of a Digital Video Ad Serving Template (VAST), delivery over the Internet.

Systems and methods for verification and delivery of compliant video advertisements to devices by utilizing a proxy server are described herein.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in various embodiments.

Content Routing

Various embodiments described herein can be implemented over a network, such as the Internet. The Internet is a network between multiple Internet Service Providers (ISPs). Companies that have content (such as content distribution networks) exchange their content with ISPs that have users attempting to see the content. The ISPs exchange content, or Internet traffic, at peering points and data centers.

One method used for routing between ISPs and content providers is Border Gateway Protocol (BGP). An ISP may route traffic to the destination Internet Protocol (IP) Address based on how the content provider is announcing the IP address on the Internet. It is possible for a content provider to have one IP address announced, and be present, in multiple physical locations. These Internet Protocol (IP) addresses may be in either IPv4 or IPv6 format.

North American and European exchange points are generally in major metro areas, such as Los Angeles, Chicago, New York, London, and Amsterdam. As an example, assume a content provider is announcing the same publicly routable IP address (e.g. 69.1.64.1) in Los Angeles, Chicago, New York, London, and Amsterdam. Also assume that an ISP peered, or exchanged traffic, in each of those locations with that content provider. The ISP users in the Western United States should be routed to Los Angeles; whereas the same ISP users in Ireland should be routed to London.

In the event of a network outage in one location, the content provider may stop announcing the route at that location, and BGP routing could route ISP users to a different location. For example, if the content provider has a network outage in Los Angeles, the ISP may route their west coast users to either Chicago or New York. It is difficult and expensive to exchange traffic, or peer, at each location that both the content provider and ISP have peering. For example, a content provider may have ten exchange points in the United States, and only peer with a European ISP in one of those locations. Thus, all of the European ISP users will be directed to that one exchange point. In some situations, it is impossible for the content provider to peer directly with the ISP. In that case, the traffic will transit through other ISPs or service providers in order to reach its destination. There are several commercially available databases that estimate a user's physical location based on its IP address. These databases are commonly used by content providers to estimate the user's physical location Content Providers and Content Servers Internet video streaming starts with content ingestion. Content can be delivered on tape, DVD, via satellite dish, etc. Content can be any audiovisual video capable of being digitally delivered to the user, including without limitation second video ads, two-hour long movies, or 24×7 linear channels. The content may then be encoded into a format compatible with the viewers' device.

Video clips and movies are stored on video content storage servers. Live feed is continuously ingested. A playlist tells the master server which files to play, and when. The master server then sends the stream to edge servers, located in various parts of the world. The viewer connects to the Internet, and is directed to the DNS server. The DNS server then directs the viewer to the authentication server, or directly to the electronic program guide (EPG) server Content providers may maintain multiple copies of the same content in multiple servers and multiple locations. These multiple locations are often referred to as points of presence (POP's).

It should be understood that the content servers may be loaded with different operating systems and may have multiple software applications installed and capable of running in connection with the operating system, for facilitating platform functionality.

The content servers may be connected to the Internet and traffic may be routed to the servers' IP Address. The content provider can have one or more servers per POP. Additionally, the content provider can segment user requests and/or responding content traffic at each POP. The server responding to the content request is not required to be at the POP where the viewer request arrived.

In one aspect of the invention, a user's device may be connected to the Internet and may be used to connect to and receive content from a content provider. Users can employ various types of devices to connect to the network and Internet. Examples of these devices include but are not limited to computers, smart phones, tablet computers, smart televisions, and television set top boxes. A television set top box is a device that connects to the Internet and the television's input panel.

When a user's device requests content from a content provider, a number of variables may be provided to the content provider in connection with the user's request. For example, the user's request may include one or more of the following information: User agent, Browser type, Internet Protocol (IP) address, a globally-unique identifier (GUID) that may be represented, for example, as a 32-character hexadecimal string, Unique Device (or viewer) ID, Device Operating System (Windows, Linux, etc), and acceptable languages.

The content server may automatically timestamp the user's request. After the server decides that it can and should provide the requested content to the user, it will supply the content, and optionally update one or more database tables documenting the transaction event.

The Interactive Advertising Bureau's (IAB's) Video Ad Serving Template (VAST) specification is a universal XML schema for serving ads to digital video players, and describes expected video player behavior when executing VAST-formatted ad responses. VAST provides a common protocol that enables ad servers to use a single ad response format across multiple publishers/video players. In 2008, the IAB introduced the first version of VAST to the video advertising marketplace, which has since been widely adopted throughout the industry. In 2009 features were added that enabled additional functionality and more clarity. Today, as the in-stream digital video advertising market becomes more sophisticated, additional features and functionality are required to improve support for in-stream ad display and reporting. However, this protocol relies on an assumed capability of the video device that is not found in many of the devices.

The VAST specification includes description of the ad, and the format for the delivered ad such as frame size and encoding protocol. Due to the increase in the number of mobile devices, tablets, gaming consoles, etc a single format will not play on all devices. Further, many advertisers have ignored some encoding protocols as they were primarily used on first generation devices. Thus many of the ads require transcoding from one encoding protocol to a different protocol; and/or transrating from one frame size or bit rate to another; in order to play on all devices.

For purposes of discussion, 'non-VAST compliant' device references an internet connected device that does not have the requisite video player, application or software to produce, send, or receive HTTP signals required to parse a VAST ad server response and use the data, or may be otherwise incapable of creating or processing VAST-compliant requests or responses.

For purposes of discussion, 'non-VAST compliant' ad server references an internet connected video ad server that either a) does not provide video clips formatted to meet or b) does not have the software to produce, send, or receive HTTP signals or tracking URLS required to produce an XML schema and/or parse a VAST ad server response and use the data, or c) does not have the software to receive HTTP signal requests or receive HTTP signals or tracking URLS or to properly parse an XML schema input and/or parse a tracking URL response and/or requests for video ads from internet connected devices, and/or error responses.

The principles herein as applied as to interactions between, and networks including, combinations of VAST and non-VAST systems may also apply to interaction between, and networks including, combinations of systems using or with a particular schema or protocol and systems not using or without the particular schema or protocol. Thus, various other embodiments using different schema, protocols or systems are possible according to different embodiments.

Figure 5:
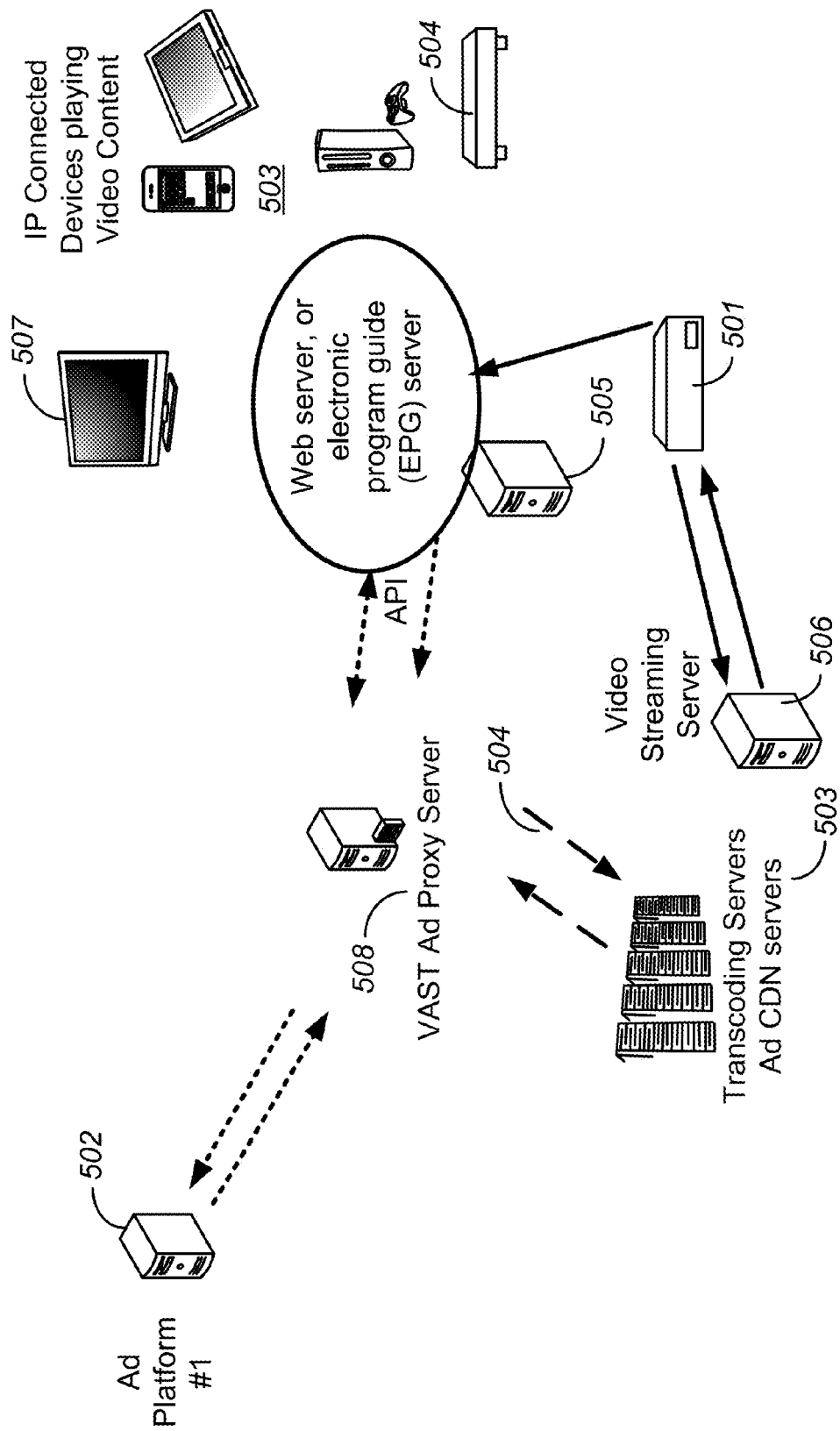
FIG. 5 is a block diagram illustrating a Web Server or Electronic Program Guide (EPG) Server connecting to VAST Proxy Server via Application Programming Interface (API). The computer hardware and computer systems usable for implementing the systems and methods described herein, listing multiple IP connected devices, and a web server or electronic program guide (EPG) server.

FIG. 5 is a block diagram illustrating various components of a system configured to provide verification of data delivery over the Internet, according to one embodiment. In one embodiment, the Viewer sends a request over the Internet to the Web Server for video content. The video content can be both live streaming, as well as video on demand (movies, video clips, etc). The Web Server may forward that request to the Ad Proxy Server. The Ad Proxy Server may perform various security measures, such as authenticating the requesting device and user. The Ad Proxy Server may determine the user agent of the Viewer's device in order to determine the correct format (mime-type) to serve video clips to the Viewer's device. The Ad Proxy Server may determine which video clips are available to serve to the Viewer based on business logic and available spots. The VAST ad proxy Server responds to a user request by returning an ASX file with the appropriate video content references.

The Advanced Stream Redirector (ASX) format is a type of XML metafile designed to store a list of Windows Media files to play during a multimedia presentation. It is used frequently on streaming video servers where multiple video content files are to be played in succession. A VAST ad proxy Server may support a number of streaming protocols, such as RTSP, MMS, RTMP, HLS, and HTTP. In some embodiments, ASX files have MIME type video/x-ms-asf. For example, an ASX file may include the following structure:

```
<ASX Version = "3.0">
  <ENTRY>
    <REF HREF = "mms://server1/welcome1.asf" />
  </ENTRY>
  <EVENT NAME="test" WHENDONE="NEXT">
  </EVENT>
  <ENTRY>
    <REF HREF = "mms://server1/sample.asf" />
  </ENTRY>
</ASX>
```

In some embodiments, the Ad Proxy Server may also create WSX files. A WSX file is an XML file that defines the sequence of ads and media in a playlist, and provides information as to how they should behave. WSX files are used for server-side playlists. For example, WSX file may contain the following:

```
<?wsx version="1.0"?>
<smil>
  <seq id="sq1">
    <media id="video1" src="clip1.wmv" />
    <media id="video2" src="clip2.wmv" />
  </seq>
</smil>
```

In some embodiments, the Ad Proxy Server may also create m3u8 files. An m3u8 file is an XML file that defines the sequence of ads and media in a playlist, and provides information as to how they should behave. m3u8 files are used for server-side playlists. For example, m3u8 file may contain the following:

TABLE-US-00002

EXTM3U #EXT-X-STREAM-INF:PROGRAM-ID=1, BANDWIDTH=440000
http://l1.media.vwxyz.com/adsTarget/Target_440.m3u8 #EXT-X-STREAM-INF:PROGRAM-ID=1, BANDWIDTH=640000
http://l1.media.vwxyz.com/ads/Target/Target_640.m3u8 #EXT-X-STREAM-INF:PROGRAM-ID=1, BANDWIDTH=1140000
http://l1.media.vwxyz.com/ads/Target/Target_1140.m3u8 #EXT-X-STREAM-INF:PROGRAM-ID=1, BANDWIDTH=1340000
http://l1.media.vwxyz.com/ads/Target/Target_1340.m3u8 wherein "Target_440.m3u8" may comprise a nested playlist similar to the following:

TABLE-US-00003

EXTM3U #EXT-X-TARGETDURATION:10 #EXT-X-MEDIA-SEQUENCE:0 #EXTINF:10,
http://l1.media.vwxyz.com/ads/Target/Target_440/fileSequence0.ts
EXTINF:10, TABLE-US-00003-continued

```
http://ll.media.vwxyz.com/ads/Target/Target_440/fileSequence1.ts
#EXTINF:10,
http://ll.media.vwxyz.com/ads/Target/Target_440/fileSequence2.ts
#EXT-X-ENDLIST
```

In some embodiments, the Ad Proxy Server may also create proprietary quasi-XML files, such as but not limited to Vidillion Markup Language or 'VML'. A VML file is an quasi-XML file that defines the sequence of ads and media in a playlist, plus additional non-VAST template information, and provides information as to how they should behave. VML files are used for server-side playlists, plus transfer of additional data between the VAST ad proxy Server and the ad server, or the video player, or both the ad server and the video player. For example, VML file may contain the following:

```
<?wsx version="1.0"?>
<smil>
    <seq id="sq1">
        <media id="video1" src="clip1.wmv" />
        <media id="video2" src="clip2.wmv" />
    </seq>
</smil>
<vml>
    <Service_Provider>
        <Vid_Cust_ID>1000001</Vid_Cust_ID >
    </Service_Provider>
    <Source>
        <Device_IP_Address>10.9.8.7</ Device_IP_Address>
    </Source>
    <Content>
</vml>
<VAST version="2.0">
</VAST>
```

VAST Ad Proxy Server

As illustrated in FIG. 5, a user's request for video content, in connection with an embodiment, may be routed to a VAST ad proxy Server. The VAST ad proxy Server, in response to a user request, generates http responses and/or playlists in a format usable by the users video device. These playlists can be ASX, WSX, SMIL, etc files containing a listing of one or more locations containing the requested or other video content that should be accessible to the user's device in response to the user's initial request.

VAST ad proxy Server may digitally sign a publisher's media streaming requests for streams that are protected. For example, the VAST ad proxy Server could sign the stream using a secure token, a password, or a hash. In some embodiments, VAST ad proxy Server may bypass this security step if the media streams are protected with Digital Rights Management (DRM) access control. The media servers can then validate that each streaming request is authorized, and reject those that are not.

In some embodiments, a user requesting content may be routed to the closest VAST ad proxy Server. Determination of the closest VAST ad proxy Server may be accomplished using any number of methodologies, including, for example, by use of BGP routing. In some scenarios, the VAST ad proxy Server may use the user's IP address to determine the country or area in which the user is located, and may then direct the user to the closest content media server based on such country or area. A variety of approaches may be used for determining a user's location relative to requested content and for directing a user's request to a server located close to the user's location.

The VAST ad proxy Server may provide the functionality to direct a single viewer, a small ISP, or a metro area to a specific POP, regardless of distance. The VAST ad proxy Server may provide the content operator with the opportunity for granularity in delivering traffic to the closest POP to the viewer.

In one embodiment, VAST ad proxy Server may be accessed using a single global sub-domain name (host.domainname.net). That sub-domain name may resolve to a single IP address that is announced globally by the content provider via BGP from multiple locations. This routing approach would permit users to be routed to the "nearest" point on the net announcing the given destination IP when attempting to connect to VAST ad proxy Server's single global sub-domain name.

The use of such a sub-domain name may permit certain failover capabilities in the VAST ad proxy Server. If there is a network issue in one POP, the content provider discontinues announcing that IP address from that POP, while the single IP address is announced globally via BGP from the remainder of the POPs. Thus there is automatic fail-over to a different data center, if one server or one data center is inaccessible.

In some embodiments, VAST ad proxy Server may alternatively utilize Anycast routing methodologies. Anycast is a network addressing and routing methodology in which datagrams from a single sender are routed to the topologically nearest node in a group of potential receivers all identified by the same destination address.

In addition to the single global sub-domain name, the VAST ad proxy Server in each POP may also have its own local sub-domain name and local IP address. Each data center hosting a VAST ad proxy Server (POP) may also have a de specific sub-domain name (e.g. host.domainname.net). In this manner, the features and functionality performed by the VAST ad proxy Server may be replicated in order to provide high availability clusters for reliability and scalability.

According to an embodiment, regardless of which VAST ad proxy Server a request ends up in, the media URLs embedded in each ASX references the content server POP closest to the requester, based on a geo-lookup off of the requester s IP address; or to a POP specified on other criteria.

Traffic Director

One component of the VAST ad proxy Server is Traffic Director. The objective of Traffic Director is to determine the location of the user, and then connect the user to the content provider's closest point of presence (POP) that has the content that the viewer requested. The VAST ad proxy Server may use subdomain names to identify the location of the POP. For example, the VAST ad proxy Server may use the following: Global: host.domainname.net; Localized: host-poplocationcode.domainname.net.

Poplocation Code is a three character acronym based on the nearest major airport code. The airport codes are based on the International Air Transport Association airport code. Poplocationcode. Domain-name.net with the hyphen identifies a POP; containing groups of IPs, where the IPs may change often. The quantity of IPs per area will vary based on load. There are multiple DNS servers for host.domainname.net located in multiple locations. Viewers in different countries doing a trace route use different DNS servers; and may get different results. VAST ad proxy may also use sub-domain names to identify the customer that owns the content. For example, the VAST ad proxy may use the following: Global: customernamecode. Domain-name.net; Localized: customernamecode-lax.totalstream.net.

By way of example, viewers tracing to host-poplocation-code.domain-name.net from New York should resolve to 69.1.92.106, 69.1.92.122 IPv4 IP addresses in Ashburn; while viewers tracing to host-poplocationcode.domain-name.net from Los Angeles should resolve to 69.1.67.74 IPv4 IP addresses in Los Angeles Total-stream.net with the hyphen resolves to IPs that are globally announced (The 69.1.70.0/24 IPv4 IP addresses network). Viewers tracing to host.domainname.net will go to the closest VAST ad proxy Server based on BGP routing.

VAST ad proxy sub-domain names can also resolve to other sub-domain names, by using CNAME records. A CNAME record or Canonical Name record is a type of resource record in the Domain Name System (DNS) that specifies that the domain name is an alias of another, canonical domain name. By doing this, the content provider can direct traffic from other sources, and/or other content providers.

In some embodiments, Traffic Director uses the country codes from ISO 3166 to assign countries to POPs, for the purpose of calculating distances to the viewer. ISO 3166 is a standard published by the International Organization for Standardization (ISO). It defines codes for the names of countries, dependent territories, special areas of geographical interest, and their principal subdivisions (e.g., provinces or states). If a country is not specifically named, it will be routed based on the continent. Traffic Director utilizes a continent-country-pop table that maps continents and countries to existing content providers POPs. As an example, Traffic Director may use the following ISO 3166 Codes in its table:

| Country | POP |
|---------|-----|
| "AD" | "customernamecode-ams.domain-name.net" |
| "AE" | "customernamecode-lax.domain-name.net" |
| "AF" | "customernamecode-lax.domain-name.net" |

In some embodiments, Traffic Director may use the average latitude and longitude for US States and Canadian Territories for the purpose of calculating distances. Large, populous states (e.g. California) are split into sections. Traffic Director may use two letter codes to represent states. A sample list is:

| State | Latitude | Longitude |
|-------|----------|-----------|
| AK | 61.3850 | −152.2683 |
| AL | 32.7990 | −86.8073 |
| AR | 34.9513 | −92.3809 |

In other embodiments, Traffic Director may also use commercially available databases to estimate the user's physical location, including based on IPv4 IP address.

Intermediate Server, or 'Proxy' Server, VAST Template and Playlist Creation

In the standard implementation, an IP connected device (101) playing video content will send an HTTP request to a video ad server (102), as illustrated in FIG. 1. This is also known as an URL request. The HTTP request contains a string of variables. The ad server (102) will respond with an XML file, and with a video ad to be played by the IP connected device (101). When the IP connected device (101) completes playing the video ad, the IP connected device (101) sends a second HTTP string to the video ad server (102). The format and data contained within the various XML files and XML Schema Definition ("XSD") is specified in the VAST standard.

Figure 2:
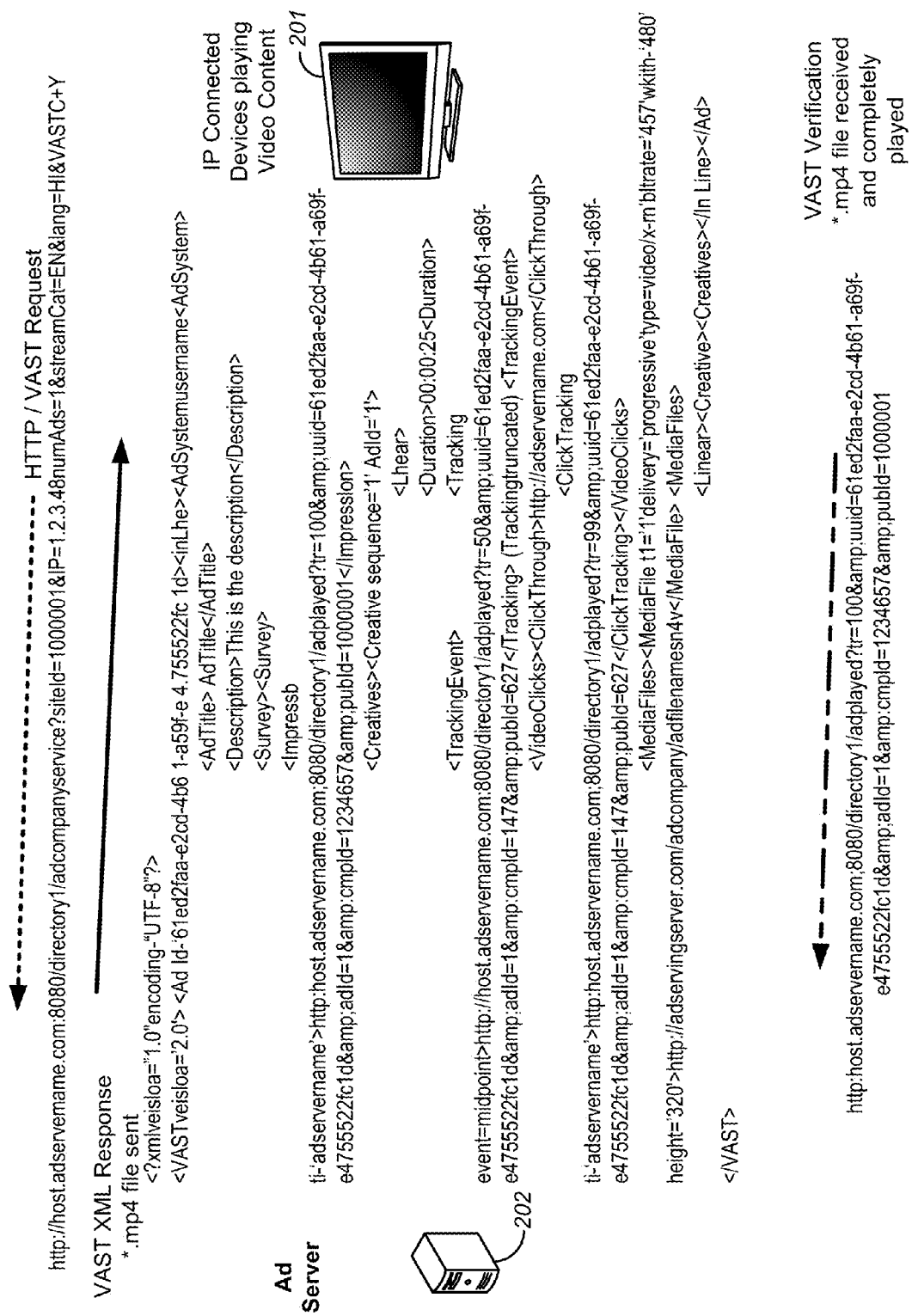
FIG. 2 is a block diagram illustrating various components of a system configured to provide request, response, and verification of a Digital Video Ad Serving Template (VAST), delivery over the Internet, including sample HTTP and Extensible Markup Language (XML) calls.
Figure 3:
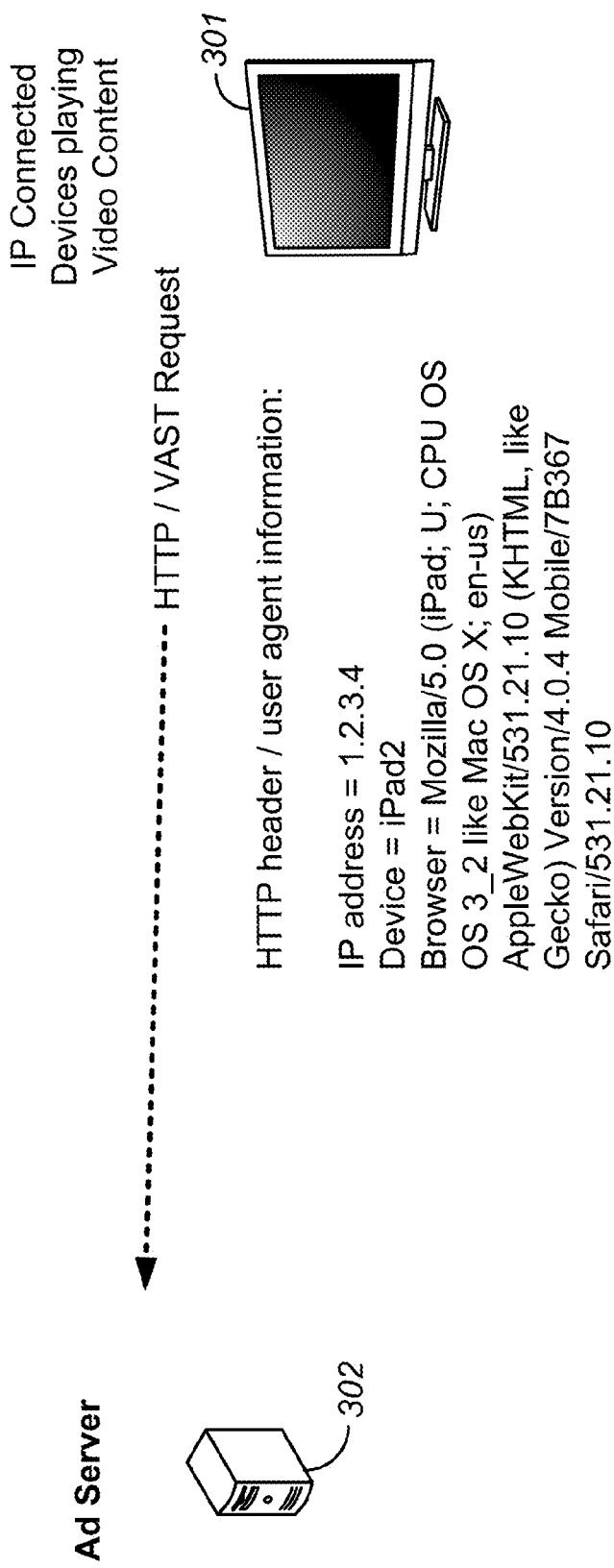
FIG. 3 is a block diagram illustrating various components of a system configured to provide an HTTP request over the Internet including sample HTTP header/user agent information

FIG. 2 illustrates an example of an HTTP request by the IP connected device (201) with variables, and the ad server (202) XML response. After the video ad is played by the IP connected device (201), it sends a second HTTP string as shown in FIG. 2. The ad clip format can be in different codecs, and in different bit rates, as described in http://www.iab.net/media/file/IAB-Video-Ad-Format-Standards.pdf In some embodiments, IP-connected devices (301) may include other information within the HTTP header of the HTTP request. As shown in FIG. 3, this may include, for example, the IP address, user agent, device type, browser, operating system, player, etc.

Figure 4:
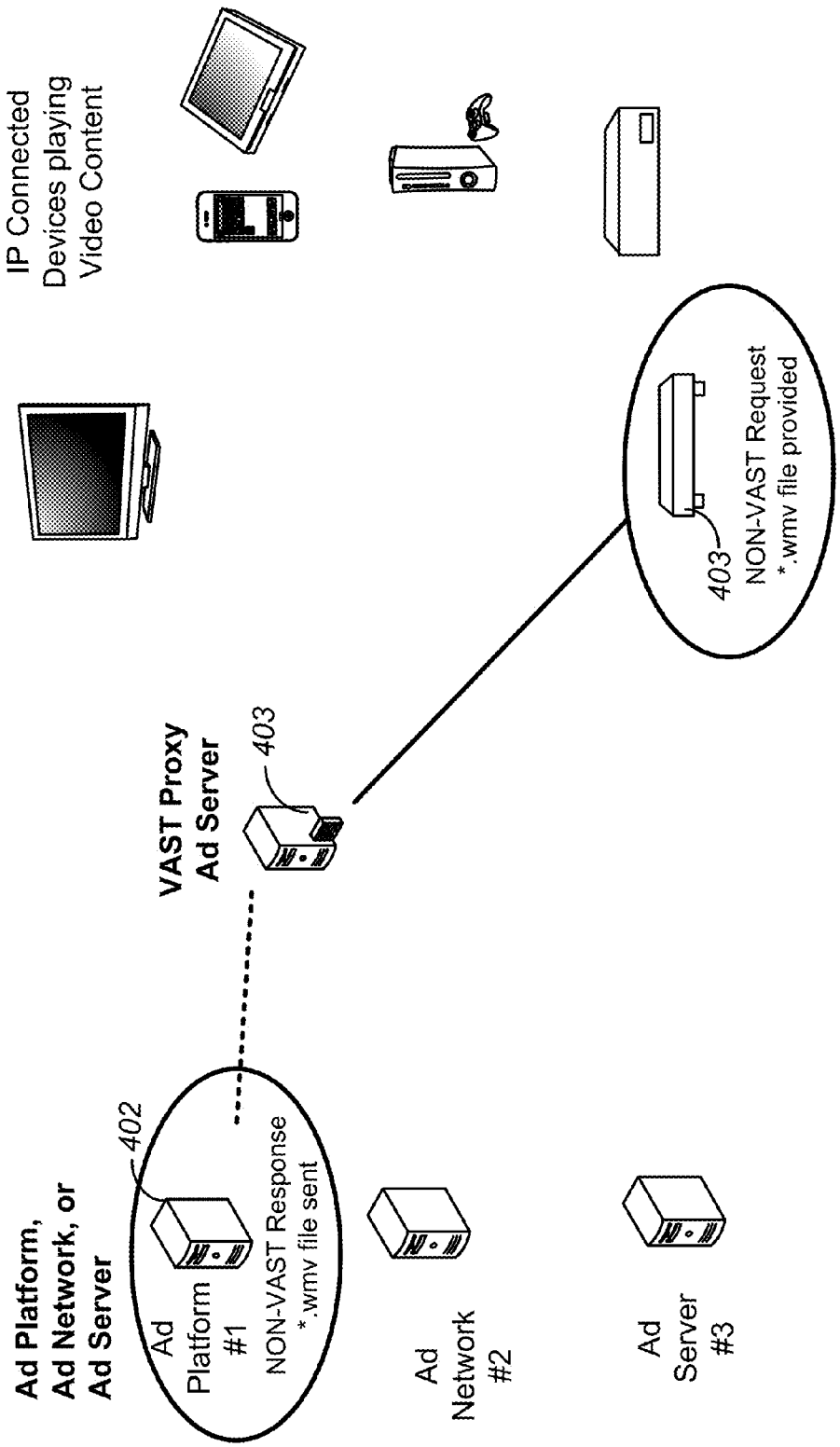
FIG. 4 is a block diagram illustrating computer hardware and computer systems usable for implementing the systems and methods described herein, for non-VAST compliant ad server, and non-VAST compliant set top box (STB) and a Ad Proxy Server.

Some IP-connected devices may not contain the necessary applications or software required to make an HTTP request in the format necessary to be VAST compliant, or to process a VAST response. Additionally, some ad servers do not provide XML in the format necessary to be VAST compliant. In some embodiments, as illustrated in FIG. 4, an ad proxy server (403) can be used between the IP connected device and the ad server. The Viewer sends a request for content over the Internet that is forwarded to the VAST Proxy server (403). The VAST proxy server (403) may verify that the user is authenticated to connect to the system, it may verify that the user with a billing system, it may perform various security measures, it may optionally store the connection information in a separate database server. The video content can be both live streaming, as well as video on demand (movies, video clips, etc). The ad proxy server (403) will receive the HTTP requests from the IP connected devices, and format an HTTP request to the ad server. In FIG. 4, a set top box (STB) (401) that does not have a player or webkit application software necessary to make a VAST compliant HTTP request sends that request to the VAST proxy server. The VAST proxy server creates the HTTP request and forwards that request to the ad server (402). In this case, that ad server responds with an XML file that is not VAST compliant, to the VAST proxy server. The VAST proxy server creates the VAST compliant XML file, and forwards that XML file to the set top box (STB) (401), along with a request for a video ad to the ad server. After the set top box (STB) (401) plays the ad, it sends an HTTP signal to the VAST Proxy server, which forwards the HTTP signal to the ad server (402).

In a different embodiment, illustrated in FIG. 5, the IP connected device (501) will make a request for content (to a web page, electronic program guide, etc) Video content may be selected by viewers using any of a variety of, such as by using a remote control or by clicking on a hyperlink. For example, the viewer may select desired video content by using a remote control in connection with a set-top box, while a different viewer may select desired video content by clicking on a hyperlink in a web browser on a PC or a table device. The user may request to view content in a web browser on the device. User opens browser and connects to the electronic program guide, or the web page containing the content provider's embedded link. User may be redirected to the User authentication server, subscriber management system server, or similar. The device GUID and http parameters are passed to the server. The web server provides embedded links, containing strings with the channel ID and other (optional) variables. In response to the user selecting a channel, such as channel 1234, Web server responds with a link containing the viewers channel selection, IP address, string variables and sends that to the Ad Proxy Server (504)

The Ad Proxy Server authenticates the request, determines the viewer's physical location, determines the closest POP with the content, providers additional security measures, if required, determines if an ad is available for this channel, creates the ASX file, then sends that to the viewer's device. Viewer's device processes the ASX file and presents Viewer with the content identified by the ASX file. In some embodiments, the ASX file will include advertisements for presenting to the Viewer prior to presenting the Viewer with the requested content. Events may be documented in an optional logging server.

The ad proxy server (504) will receive the HTTP request from the web page, electronic program guide, etc, and then the VAST proxy server (504) formats an HTTP request for the ad, and the content. The VAST proxy server creates the HTTP request and forwards that request to the ad server (502), including the IP address of the IP connected device (501). The ad server responds with an XML file that is not VAST compliant, to the VAST proxy server (504). The VAST proxy server creates the VAST compliant XML file, plus a playlist containing the ad plus the requested content, and forwards that playlist to the IP connected device (501). After the IP connected device (501) plays the ad, it sends an HTTP signal to the video streaming server (506), for the content originally requested from the web page, electronic program guide, etc.

In response to a request for video content by the viewer, the Ad Proxy Server may create an ASX file that includes references to the following content in the specified order:

Video Content Response 2,A - a short video clip from Video Content Server 2
Video Content Response 1,1 - a video clip from Video Content Server 1
Video Content Response 2,B - a short video clip from Video Content Server 2 and return that ASX file to the device used by the viewer. Upon receiving an ASX file response, the viewers device (501) may send video requests to Video Content Server 2, Video Content Server 1, then Video Content Server 2, in such order, in order to request viewing of the respective content identified by the ASX file. Those video servers respond by playing video content in the correct mime-type for the requesting device.

Also shown in FIG. 5 are examples of other IP connected devices, including a 'smart' phone and tablet (503), a gaming console (504) and a 'smart' TV (507). In some embodiments, the smart phone and/or tablet may also be used as a remote control for a set top box and/or smart TV, in which instance video content may additionally be displayed on said devices. Said devices are then referred to as the 'second screen'. It should be understood that any other IP-connected device capable of displaying content such as ads could be utilized in connection with such embodiments.

Figure 6:
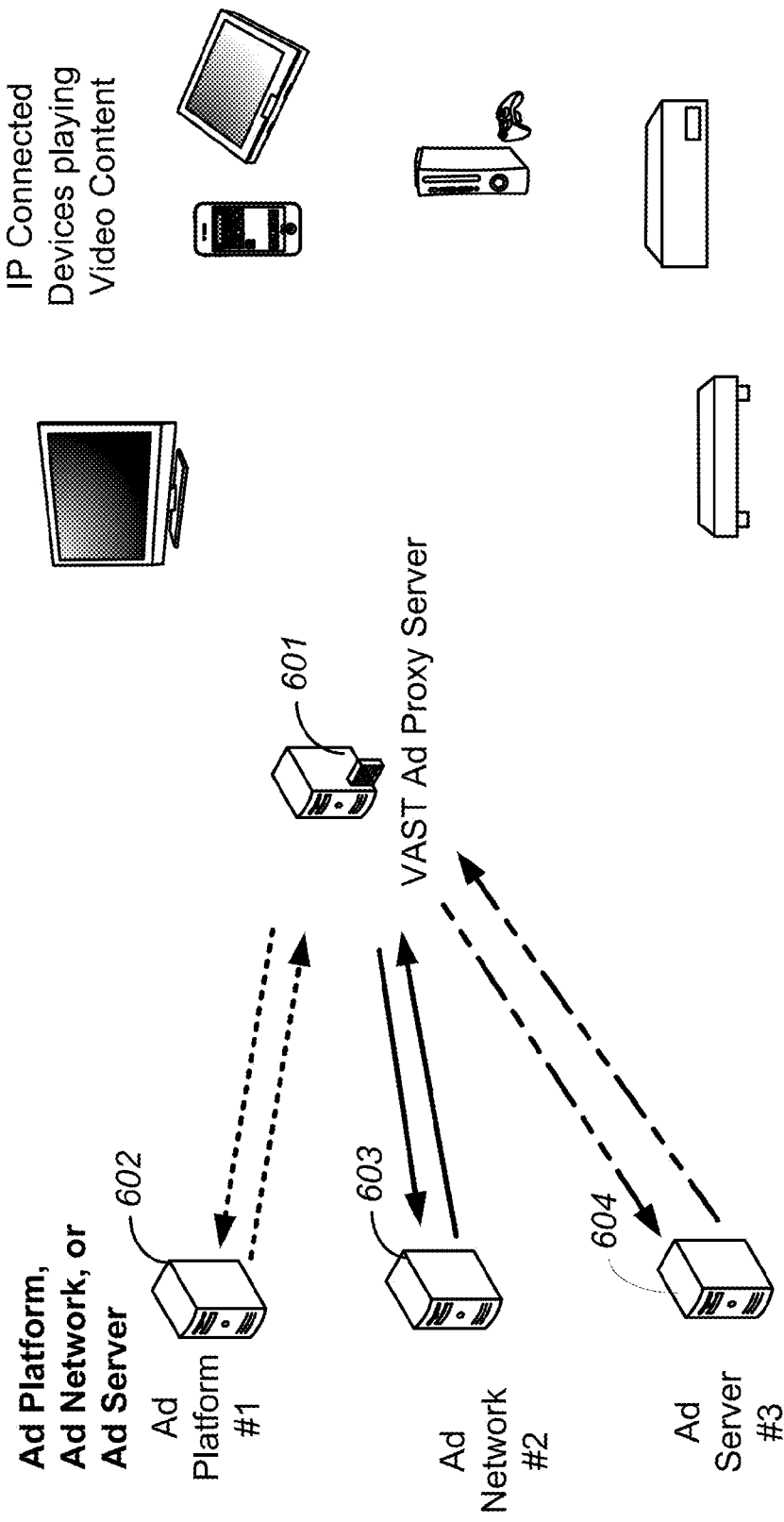
FIG. 6 is a block diagram illustrating computer hardware and computer systems usable for implementing the systems and methods described herein, for an ad server, an ad network, an ad platform, and non-VAST compliant set top box (STB), and IP connected devices capable of playing video.

References herein to ad servers, ad networks, and ad platforms are reference to any third party advertising platform that is capable of interfacing with one or more embodiments set forth herein. FIG. 6 shows the Ad Proxy Server (601) communicating over the internet to an ad servers (603), ad networks (603), and ad platforms (602). Communications can be in parallel or serial for request, and parallel or serial for response.

As an example, in some embodiments, the Ad Proxy Server (601) in FIG. 6 may receive a VAST compatible XML client-side request for content, from an internet connected device. Using business logic, the Ad Proxy Server (601) determines that an ad should be played prior to serving the content. Using business logic, built on multiple rule sets such as location, time of day, content genre, and other data inputs, the Ad Proxy Server (601) may then send a request for an ad to ad platform #1 (602). Ad platform #1 (602) may then respond with VAST compatible XML schema with multiple data inputs, including but not limited to availability of a 15 second ad, ad name, URL, and other data. The Ad Proxy Server (601) may then create an ASX that includes the ad URL and the content URL and forwards the ASX to the internet connected device. Upon completion of the ad playing, the Ad Proxy Server may then send an HTTP signal containing VAST compatible XML schema with multiple data inputs to ad platform #1 (602).

As an example, in some embodiments, the Ad Proxy Server (601) in FIG. 6 may receive a VAST compatible XML server-side request for content, from an internet connected device. Using business logic, the Ad Proxy Server (601) determines that an ad should be played prior to serving the content. Using business logic, built on multiple rule sets such as location, day of week, language, and other data inputs, the Ad Proxy Server (601) may then send an HTTP request for an ad to ad platform #1 (602), ad network #2 (603), and ad server #3 (604). Ad platform #1 (602) may then respond with VAST compatible XML schema with multiple data inputs, including but not limited to availability of a 15 second ad, ad name, URL, and other data; however, it is the first time that this specific ad is introduced to the Ad Proxy Server. Ad network #2 (603) may then respond with VAST compatible XML schema with multiple data inputs, including but not limited to availability of a 15 second ad, ad name, URL, and other data. Ad server #3 (604) may then respond with VAST compatible XML schema with multiple data inputs, including but not limited to availability of a 30 second ad, ad name, URL, and other data. The Ad Proxy Server (601) may then create an ASX that includes the ad URLs from Ad network #2 (603) and Ad server #3 (604) and the content URL and forwards the ASX with two ads to the internet connected device. Upon completion of both ads playing, the Ad Proxy Server may then send an HTTP signal containing VAST compatible XML schema with multiple data inputs to ad network #2 (603) and Ad server #3 (604). Concurrently, the Ad Proxy Server (601) may use business logic to determine whether to forward the new ad from Ad platform #1 to be manually reviewed, and/or transcoded/transrated, for future use.

As an example, in some embodiments, the Ad Proxy Server (601) in FIG. 6 may receive a VAST compatible XML server-side request for content, from an internet connected device. Using business logic, the Ad Proxy Server (601) determines that multiple ads may be played prior to serving the content. Using business logic, built on multiple rule sets such as device user agent and date of week and other data inputs, the Ad Proxy Server (601) may then send an HTTP request for an ad to ad platform #1 (602), ad network #2 (603), and ad server #3 (604). Ad platform #1 (602) may then respond with VAST compatible XML schema with multiple data inputs, including but not limited to availability of a 15 second ad, ad name, URL, and other data. Included in the Ad platform #1 response is a stated ad value of $0.xx. Ad network #2 (603) may then respond with VAST compatible XML schema with multiple data inputs, including but not limited to availability of a 15 second ad, ad name, URL, and other data. Included in the Ad network #2 response is a stated ad value of $0.yy. Ad server #3 (604) may then respond with VAST compatible XML schema with multiple data inputs, including but not limited to availability of a 30 second ad, ad name, URL, and other data. Included in the Ad server #3 response is a stated ad value of $0.zz; plus the requirement that the ad be played immediately prior to the content. The Ad Proxy Server (601) may then create an ASX that includes the ad URLs from Ad platform #1 (602) first, and Ad server #3 (604) second and the content URL and forwards the ASX with two ads to the internet connected device. Upon completion of both ads playing, the Ad Proxy Server may then send an HTTP signal containing VAST compatible XML schema with multiple data inputs to ad platform #1 (602) and Ad server #3 (604).

As an example, in some embodiments, the Ad Proxy Server (601) in FIG. 6 may receive a client-side request for content, from an internet connected device. Using business logic, the Ad Proxy Server (601) determines that a single ad not to exceed 15 seconds may be played prior to serving the content. Using business logic, built on multiple rule sets such as device GUID and ethnic community and other data inputs, the Ad Proxy Server (601) may then send an HTTP request for an ad to ad platform #1 (602), ad network #2 (603), and ad server #3 (604). Ad platform #1 (602) may then respond with VAST compatible XML schema with multiple data inputs, including but not limited to availability of a 15 second ad, ad name, URL, and other data. Included in the Ad platform #1 response is a stated ad value of $0.xx. Ad network #2 (603) may then respond with VAST compatible XML schema with multiple data inputs, including but not limited to availability of a 15 second ad, ad name, URL, and other data. Included in the Ad network #2 response is a stated ad value of $0.yy. Ad server #3 (604) may then respond with VAST compatible XML schema with multiple data inputs, including but not limited to availability of a 30 second ad, ad name, URL, and other data. Included in the Ad server #3 response is a stated ad value of $0.zz; plus the requirement that the ad be played immediately prior to the content. The Ad Proxy Server (601) may then create an ASX that includes the ad URL from Ad network #2 (603) and the content URL and forwards the ASX with two ads to the internet connected device. Upon completion of the ad playing, the Ad Proxy Server may then send an HTTP signal containing VAST compatible XML schema with multiple data inputs to Ad network #2 (603).

As an example, in some embodiments, the Ad Proxy Server (601) in FIG. 6 may receive a client-side request for content, from an internet connected device. Using business logic, the Ad Proxy Server (601) determines that multiple ads not to exceed 60 seconds may be played prior to serving the content. Using business logic, built on multiple rule sets such as device UID and HTTP referrer agent and other data inputs, the Ad Proxy Server (601) may then send an HTTP request for an ad to ad platform #1 (602), ad network #2 (603), and ad server #3 (604). Ad platform #1 (602) may then respond with VAST compatible XML schema with multiple data inputs, including but not limited to availability of a 15 second ad, ad name, URL, and other data. Included in the Ad platform #1 response is a stated ad value of $0.xx. Ad network #2 (603) may then respond with VAST compatible XML schema with multiple data inputs, including but not limited to availability of a 15 second ad, ad name, URL, and other data. Included in the Ad network #2 response is a stated ad value of $0.yy. Ad server #3 (604) may then respond with VAST compatible XML schema with multiple data inputs, including but not limited to availability of a 30 second ad, ad name, URL, and other data. Included in the Ad server #3 response is a stated ad value of $0.zz; plus the requirement that the ad be played immediately prior to the content. However, the ad server responses are not received in a timely fashion, so the Ad Proxy Server (601) may then create an ASX that includes only the content URL and forwards the ASX with no ads to the internet connected device. The Ad Proxy Server may then send an HTTP signal containing VAST compatible XML schema with multiple data inputs to the ad servers.

As an example, in some embodiments, the Ad Proxy Server (601) in FIG. 6 may receive a non-VAST compatible XML client-side request for content, from an internet connected device. Using business logic, the Ad Proxy Server (601) determines that an ad should be played prior to serving the content. Using business logic, the Ad Proxy Server (601) may then send a request for an ad to ad platform #1 (602). Ad platform #1 (602) may then respond with non-VAST compatible XML schema with multiple data inputs, including but not limited to availability of a 15 second ad, ad name, URL, and other data. The Ad Proxy Server (601) may then create a non-VAST compatible XML that includes the ad URL and the content URL and forwards it to the internet connected device. Upon completion of the ad playing, the Ad Proxy Server may then send an HTTP signal containing non-VAST compatible XML schema with multiple data inputs to ad platform #1 (602).

As an example, in some embodiments, the Ad Proxy Server (601) in FIG. 6 may receive a non-VAST compatible XML client-side request for content, from an internet connected device. Using business logic, the Ad Proxy Server (601) determines that an ad should be played prior to serving the content. Using business logic, the Ad Proxy Server (601) may then send a request for an ad to ad platform #1 (602). Ad platform #1 (602) may then respond with VAST compatible XML schema with multiple data inputs, including but not limited to availability of a 15 second ad, ad name, URL, and other data. The Ad Proxy Server (601) may then create a non-VAST compatible XML that includes the ad URL and the content URL and forwards it to the internet connected device. Upon completion of the ad playing, the Ad Proxy Server may then send an HTTP signal containing VAST compatible XML schema with multiple data inputs to ad platform #1 (602).

As an example, in some embodiments, the Ad Proxy Server (601) in FIG. 6 may receive a VAST compatible XML client-side request for content, from an internet connected device. Using business logic, the Ad Proxy Server (601) determines that an ad should be played; however, the content is not to be served. Using business logic, the Ad Proxy Server (601) may then send a request for an ad to ad platform #1 (602). Ad platform #1 (602) may then respond with VAST compatible XML schema with multiple data inputs, including but not limited to availability of a 15 second ad, ad name, URL, and other data. The Ad Proxy Server (601) may then create a VAST compatible XML that includes the ad URL but not the content URL and forwards it to the internet connected device. Upon completion of the ad playing, the Ad Proxy Server may then send an HTTP signal containing VAST compatible XML schema with multiple data inputs to ad platform #1 (602).

Figure 7:
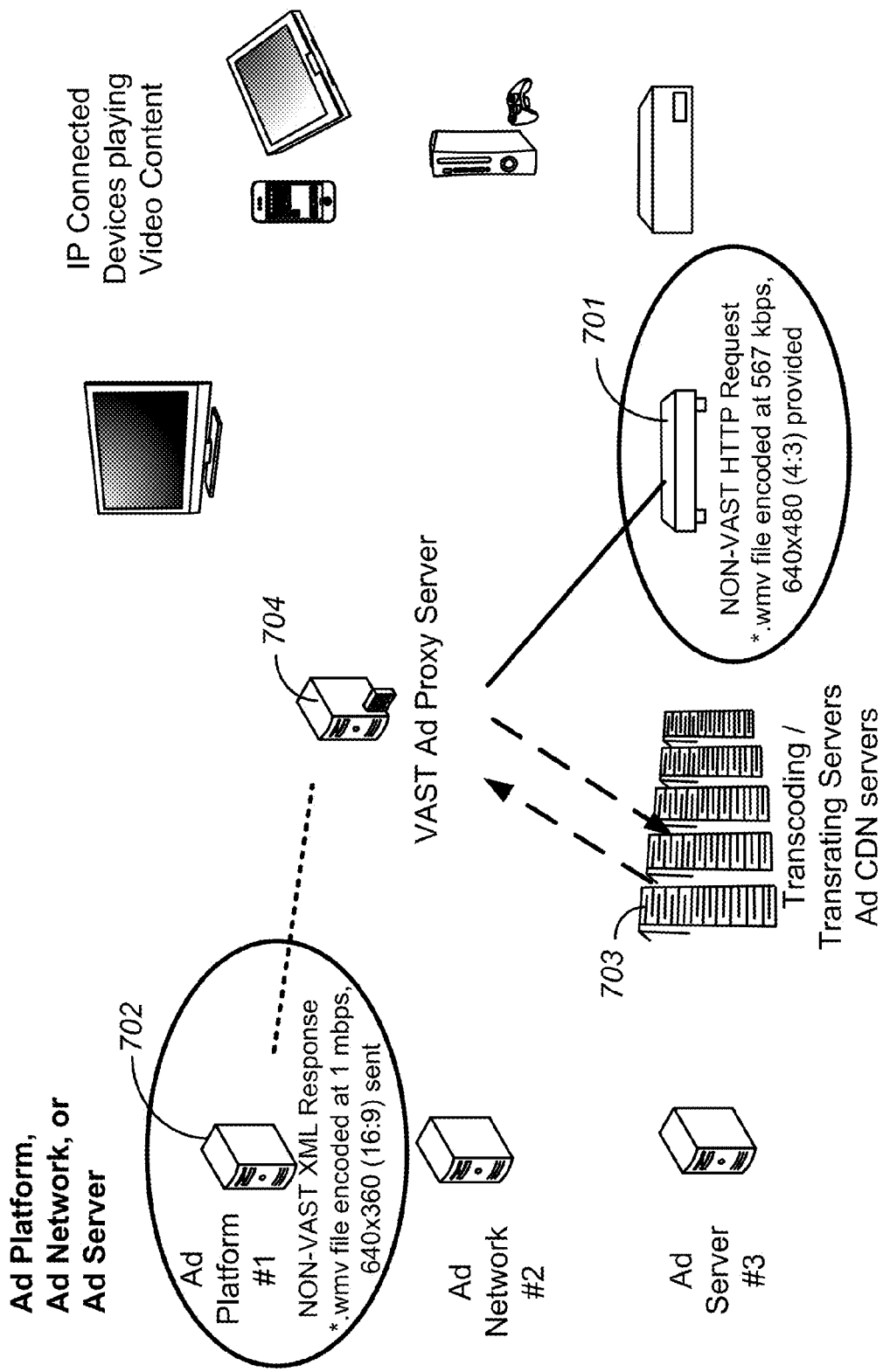
FIG. 7 is a block diagram illustrating computer hardware and computer systems usable for implementing the systems and methods described herein, for a VAST compliant ad server, and non-VAST compliant set top box (STB), including transrating the video ad clip.

In some embodiments, the ad server (702) in FIG. 7 will provide the requested ad in a frame size, or encoded bit rate that is sub-optimal for the IP connected device (701). For that instance, the ad will be transrated to the proper frame size, and bit rate by the transcoding/transrating servers (703). As an example, in FIG. 7, ad server #1 (702) provides an ad encoded in *.wmv file format at an encoding bit rate of 1 mbps, with a 640×360 frame size. The transcoding server (703) transcodes that file to a *.wmv file format at an encoding bit rate of 567 kbps, with a 640×480 frame size; for delivery to the set-stop box (701).

In one embodiment, the viewer selects the desired video content, such as by using a remote control. The electronic program guide server (806) forwards that request to the Ad Proxy Server (806). The Ad Proxy Server (806) may perform various security measures, such as authenticating the requesting device and user. The Ad Proxy Server (2704) may determine the user agent of the device in order to determine the correct format (mime-type) to serve video clips to the viewer's device. The Ad Proxy Server (804) may determine which video clips are available to serve to the viewer based on business logic and available spots. The Ad Proxy Server (804) responds to a user request by returning an ASX file with the appropriate video content references.

Figure 8:
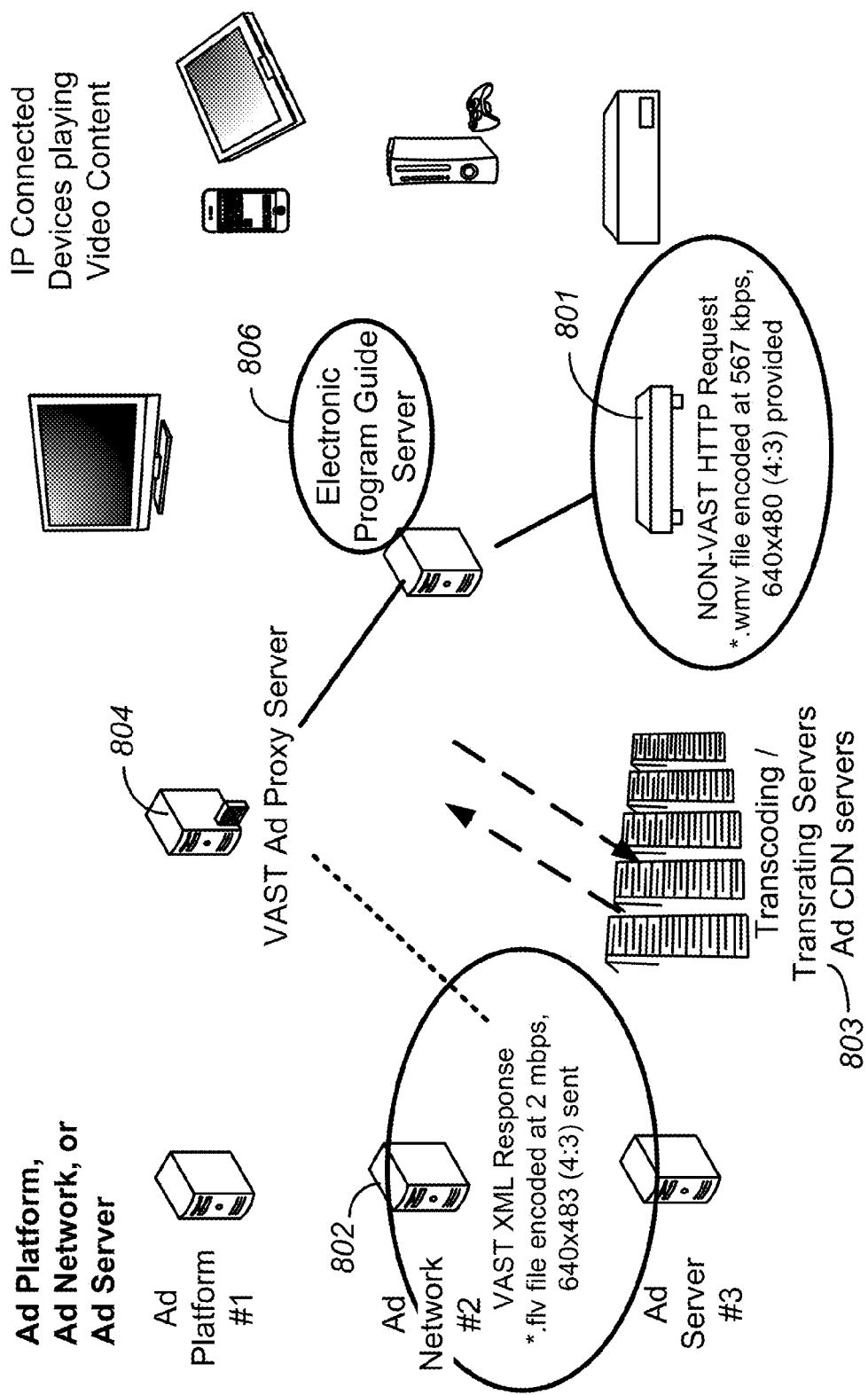
FIG. 8 is a block diagram illustrating computer hardware and computer systems usable for implementing the systems and methods described herein, for a VAST compliant ad server, and a non-VAST compliant set top box (STB), including transcoding and transrating the video ad clip.

The ad server (802) in FIG. 8 may provide the requested ad in a codec, frame size, or encoded bit rate that may be sub-optimal for the IP connected device (801). For that application, the ad will be transcoded and/or transrated to the proper codec, frame size, and bit rate by transcoding servers (803). As an example, in FIG. 8, ad server #2 (802) provides an ad encoded in *.flv file format at an encoding bit rate of 2 mbps, with a 640×483 frame size. The transcoding server (803) transcodes that file to a *.wmv file format at an encoding bit rate of 567 kbps, with a 640×480 frame size; for delivery to the set-stop box (801).

Figure 9:
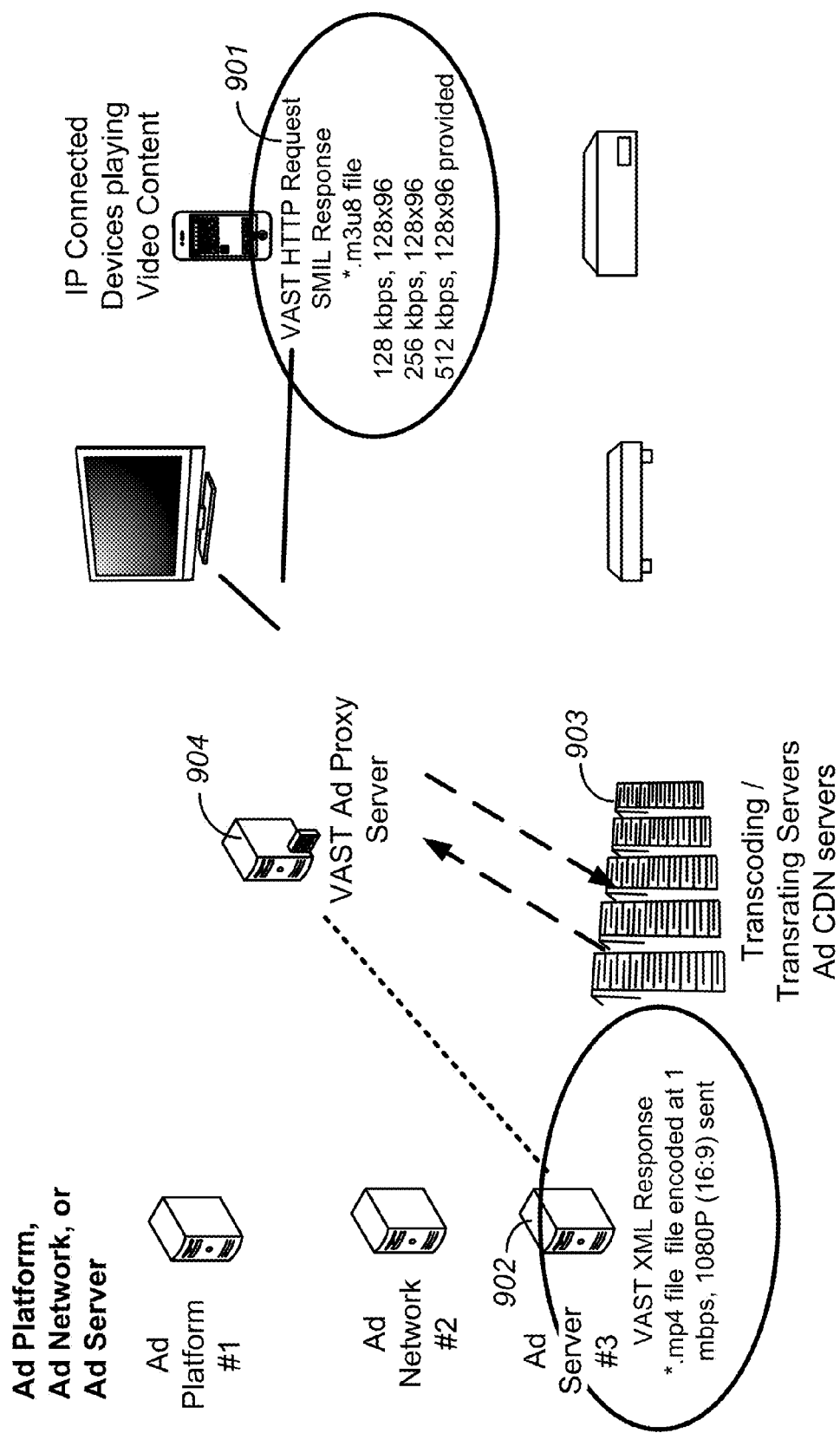
FIG. 9 is a block diagram illustrating computer hardware and computer systems usable for implementing the systems and methods described herein, for a VAST compliant ad server, and a VAST compliant 'smart' phone, including transcoding and transrating the video ad clip, with multiple bit-rate video clips.

In some embodiments, the ad server (902) in FIG. 9 will provide the requested ad in a codec, frame size, encoded bit rate, or multiple bit rates, that is sub-optimal for the IP connected device (901). For that application, the ad will be transcoded and/or transrated to the proper codec, frame size, and multiple bit rates by transcoding servers (903). As an example, in FIG. 9, ad server #3 (902) provides an ad encoded in *.mp4 file format at an encoding bit rate of 1 mbps, at 1080P. The transcoding server (903) transcodes that file to a multiple files, all with *.M3U8 file formats, at encoding bit rates of 128, 256, at 512 kbps, with a 128×96 frame size; for delivery to the smart phone (901) which has an IOS operating system. The VAST proxy server (904) creates Synchronized Multimedia Integration Language (SMIL) playlist rather than an XML playlist.

Figure 10:
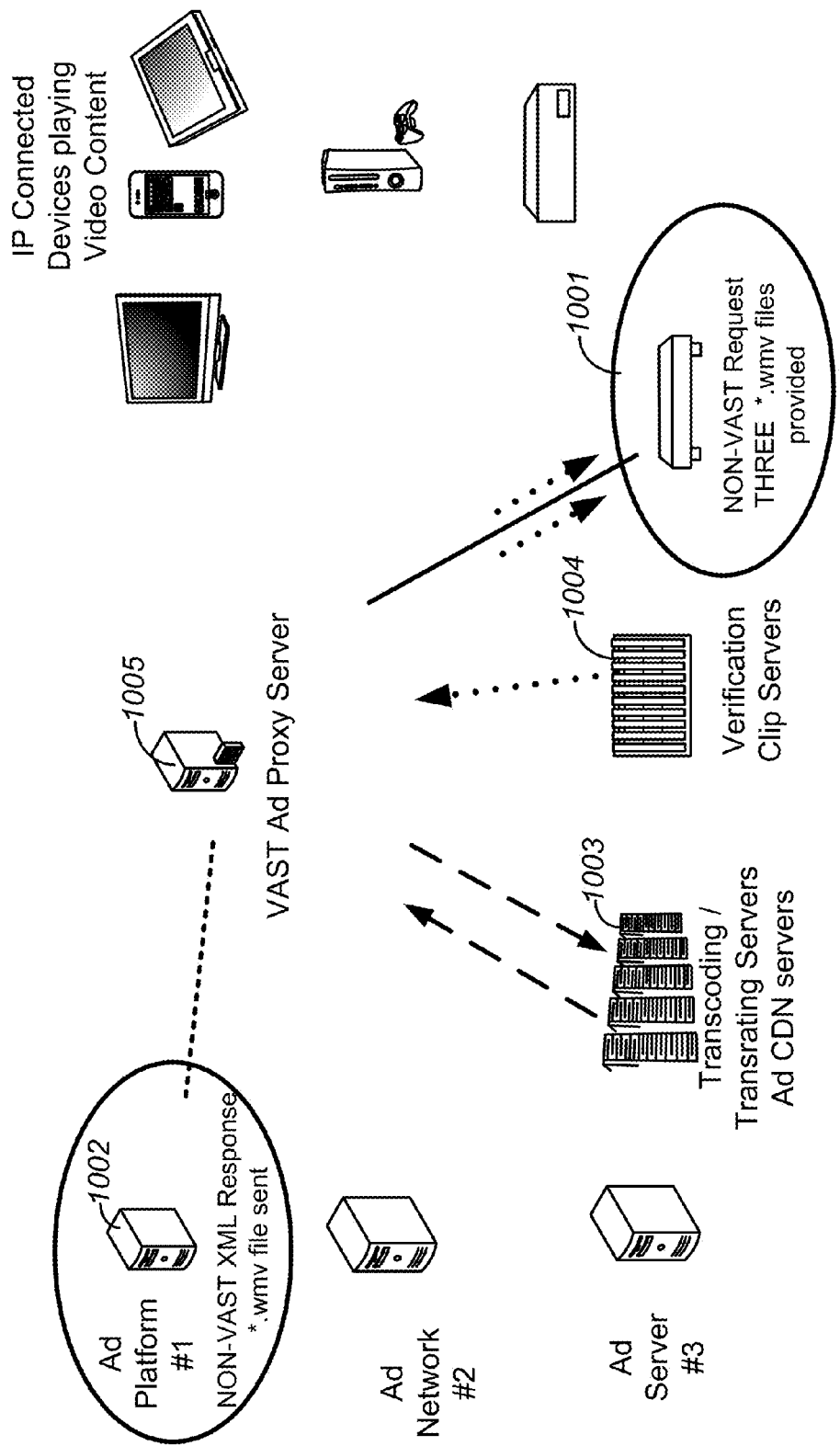
FIG. 10 is a block diagram illustrating computer hardware and computer systems usable for implementing the systems and methods described herein, for a non-VAST compliant ad server, and a non-VAST compliant IP set-top box (STB), with optional 'start' and 'stop' ad delivery verification clips.

In some embodiments, the an optional verification clip server (1004) shown in FIG. 10 will provide a short clip encoded in the same format, bit rate, and codec as the ad, immediately before and immediately after the ad, to the IP connected device (1001).

FIG. 10 illustrates a subset of the steps taken to verify content in accordance with an embodiment. User may connect a device to the Internet via the user's ISP. Device (1001) is either assigned via DHCP, or already has, an IP address. Content provider may make the content available by connecting server (1002) to the Internet and assigning a publicly routable Internet Protocol (IP) address. Content provider may update DNS server with a sub-domain name for the content location. Content provider may update the Ad Proxy Server (1005) with the POP location for the content, or the URL to the content. A library of 'start' and 'end' verification clips may be uploaded to verification server (1004). User may connect (1001) to the content provider's embedded Uniform Resource Locator (URL).

User may be redirected to the User authentication server, subscriber management system server, or similar. The device GUID and HTTP parameters are passed to the EPG server (2302). The EPG server (2302) provides embedded links or URLs, containing strings with the channel ID and other variables. User (2301) selects channel 'ABCD.' EPG server (2302) responds with a link containing the viewers channel selection, IP address, string variables and forwards that string to the VAST ad proxy Server. VAST ad proxy Server (2304) may perform one or more steps related to the request, such as one or more of the following: authenticating the request, determining the viewer's physical location, determining the closest POP with the requested content, providing additional security measures if required, determining if an ad is available for the requested channel, creating an ASX file, sending that ASX file to the viewers device (2301), and holding an ASX file in memory as a session variable embedded in an URL. For example, the VAST ad proxy Server log files (2704) may be moved to the Log Server every 2 hours, while the log files from Video Content Server 1 (2706) may be moved to the Log Server every 30 minutes.

By way of example, as illustrated in FIG. 10, the viewer may request to watch channel "ABCD" by selecting such channel from an EPG. In response, the viewer's device (1001) may be presented first with the video "verificationclipstart.wmv" for 1/10 second from verification clip Server (1004). The viewer may then be presented second content "ad1.wmv" from Video Content Server 1 (1002). The viewer may then be presented video content verificationclipend.wmv" for 1/10 second from verification clip Server (1004). Finally, the viewer may be presented with the initially requested content. In some scenarios, the viewer's player application (1001) may call for a key from a DRM server prior to playing the remainder of the content.

Figure 11:
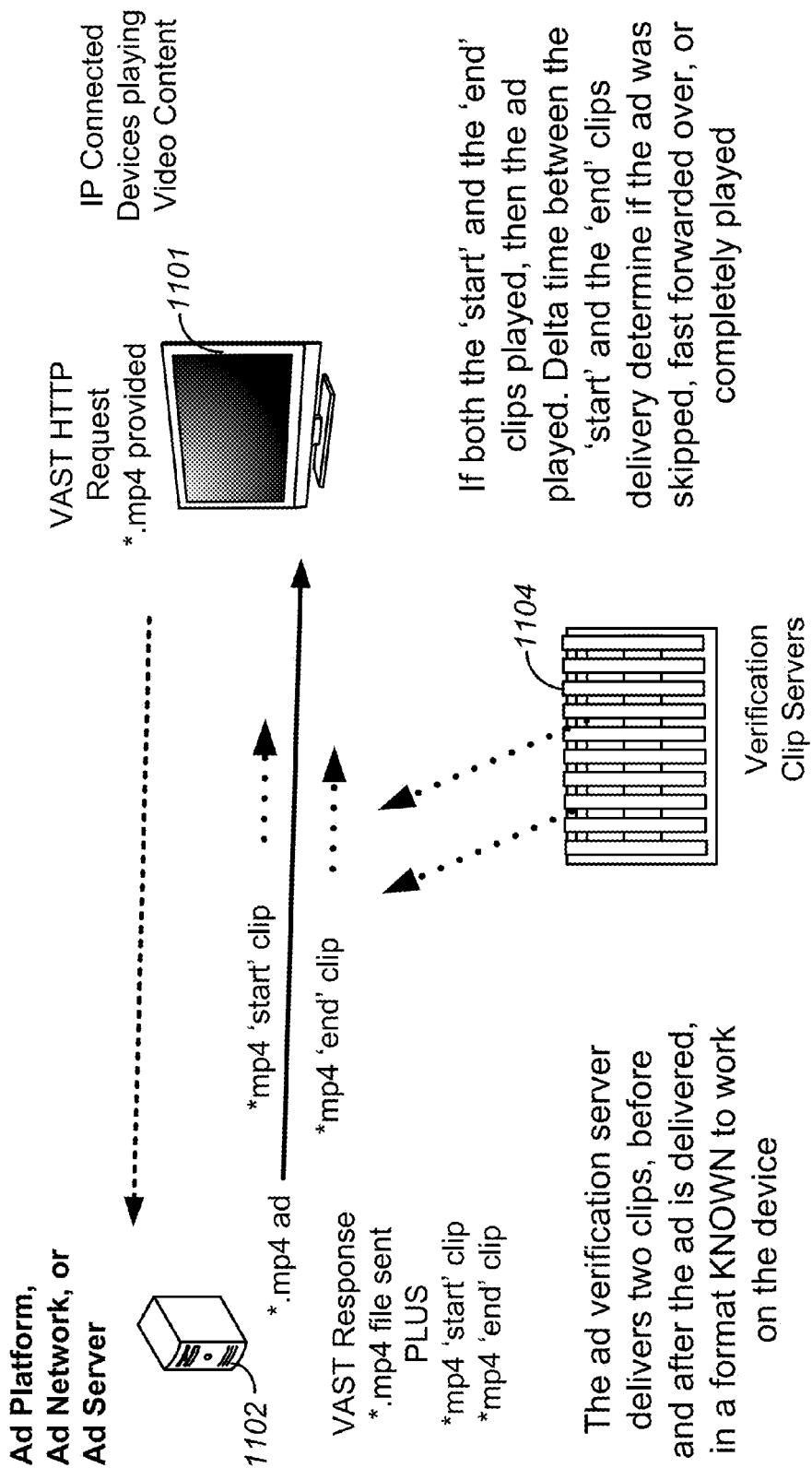
FIG. 11 is a block diagram illustrating computer hardware and computer systems usable for implementing the systems and methods described herein, for an ad server, a VAST compliant IP connected 'smart' TV, and verification clip servers, with optional 'start' and 'stop' ad delivery verification clips.

An example of the start and end clips is shown in additional detail in FIG. 11.

Figure 12:
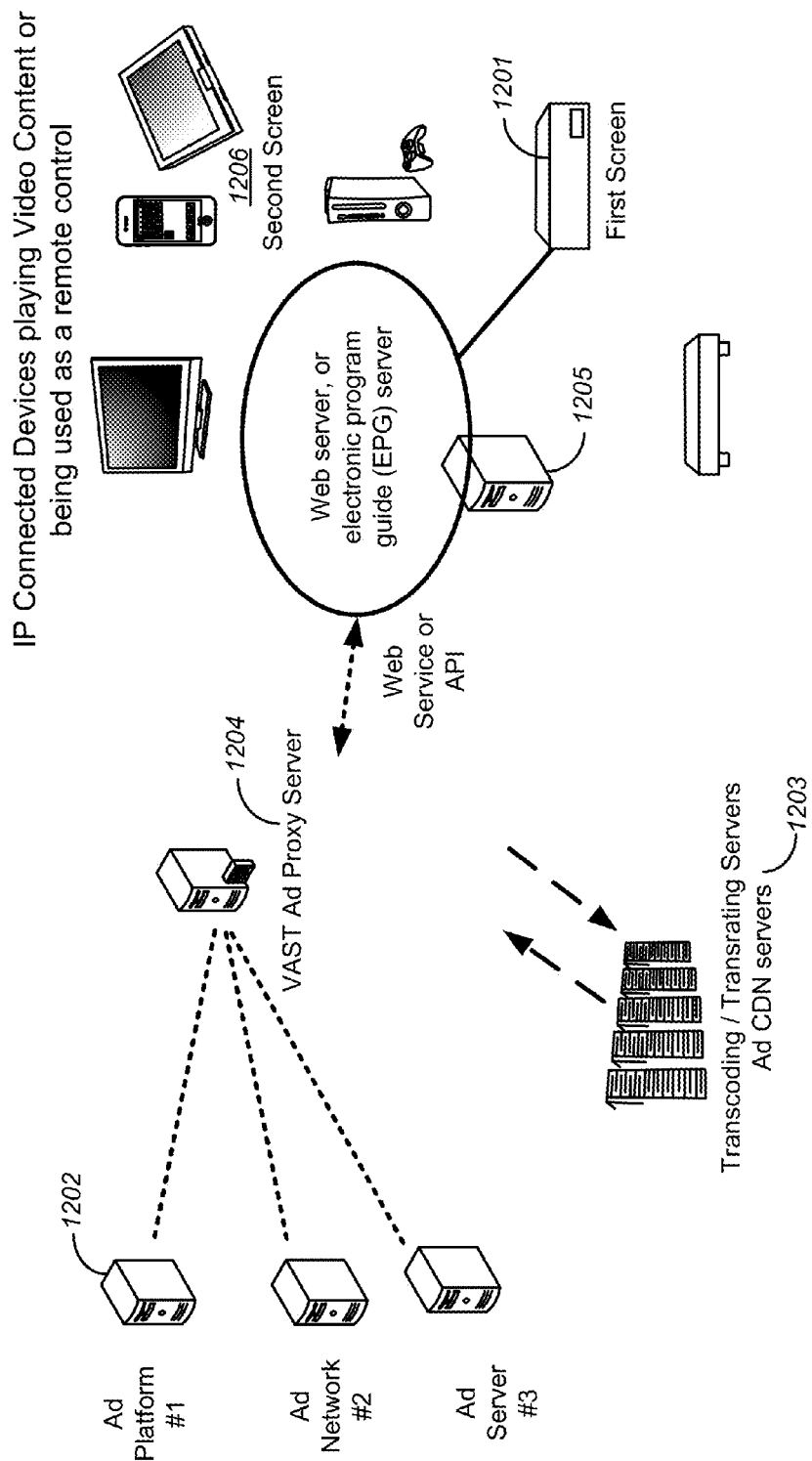
FIG. 12 is a block diagram illustrating computer hardware and computer systems usable for implementing the systems and methods described herein, for a VAST compliant ad server (1202), and a VAST compliant IP connected set top box (STB) (1201), with web service aka API connectivity between the web server or electronic program guide (EPG) server (1205) and the Ad Proxy Server (1204).

In some embodiments, the viewers second screen device (1206), shown in FIG. 12, will be used as a remote control to select content from the web server or electronic program guide (EPG) server (1205). The request for content to be displayed on the IP connected device, the 'first screen' (1201) may be made by a second IP connected device (1206) the 'second screen', said request for content (to a web page, electronic program guide, etc) Video content may be selected by viewers using any of a variety of, such as by using a remote control or by clicking on a hyperlink. For example, the viewer may select desired video content by using a remote control programmed within a smart phone or tablet (1206) in connection with a set-top box or smart TV, while a different viewer may select desired video content by clicking on a hyperlink in a web browser on a PC other IP connected device. The user may request to view content in a web browser on the 'second screen' device. User opens browser and connects to the electronic program guide, or the web page containing the content provider's embedded link. User may be redirected to the User authentication server, subscriber management system server, or similar. The 'first screen' and 'second screen' device GUID and http parameters may be passed to the web or EPG server. The web or EPG server provides embedded links, containing strings with the channel ID and other (optional) variables. In response to the user selecting a channel, such as channel 1234, Web or EPG server responds with a link containing the viewers channel selection, IP address, string variables, and other data, and sends that to the Ad Proxy Server (1204) via HTTP, XML, or other protocol.

The customers' web server or electronic program guide (EPG) server (1205), shown in FIG. 12, will be in a different location and/or on a different network, and may call the Ad Proxy Server (1204) using a Web Service or application programming interface (API), or programming script.

As an example of this embodiment, the web server or electronic program guide (EPG) server (1205) may transmit or deliver the channel line-up, or list of TV stations available, or the list of video clips presentable to the viewers (list of available video content) to the VAST ad proxy server (1204). Said transmittal or delivery list of available video content may be done in a one-off fashion; on a timed basis per minute, hour, day, week, or month; in advance of known events; in advance of requests for video content; concurrent with requests for content; or after requests for video content. Said transmittal or delivery list of available video content may also in part be derived from third-party commercial or community sources. The transmittal or delivery list of available video content may be done by physical transfer of media, or via the internet, or via other method of IP delivery, regardless of protocols. Said protocols or methods may included, but are not limited to HTTP, UDP, FTP, named pipes, specific ports, database transfer, ODBC, JSON, XML, spreadsheet transfer, RSS, news feed, etc. Said transmittal or delivery list of available video content may include, but not be limited to, channel name, content title, content description, date, time, language, genre, ethnic community, MPAA (or equivalent) rating, user rating, third party rating, cast, director and producer, show time, show duration, suggested time and/or timeframe to deliver the show, and other data inputs. Said transmittal or delivery list of available video content may include whether to display an advertisement, restrictions on advertisements, types of advertisements, recommended advertisement format and encoding (e.g. h264, wmv9, vp6, vp8, etc.), minimum and maximum bitrate for ads on this channel (based on first screen, second screen, etc), mimetype: (e.g. video/mp4, video/x-flv, video/x-ms-wmv, etc.), minimum and maximum advertising duration per advertisement spot or opportunity, maximum ads displayed per variable (per channel, per hour, per viewer, per day, per month, per campaign, etc), maximum ad count (per channel, per hour, per viewer, per day, per month, per campaign, etc), time of day or day of week restrictions for displaying ads, locations to place the ad (pre-roll, mid-roll, end-roll, overlay, etc), location to display the ad (first screen, second screen, etc), etc. Said transmittal or delivery list of available video content may include but not be limited to a blacklist of countries where ads should not run, or a whitelist of countries where ad should run. Said transmittal or delivery list of available video content may include but not be limited to a target demographics, a list of traditional gender and age based ad targeting groups (e.g. M18-24, W25-34, A65+, etc.), target zip code, city, state and/or country, or other location input, or other viewer demographic information. Said transmittal or delivery list of available video content may include but not be limited to ID codes, such as publisher, channel, content, system, identification codes. Said transmittal or delivery list of available video content may include but not be limited to delivery, partial delivery, and error codes for first or second screen devices. Said transmittal or delivery list of available video content may include but not be limited to aspect ratio of program content, (16:9, 4:3, etc), vertical resolution of program content, (480, 720, 1080, etc), whether the ad may be downscaled, whether or not the player can accept ads with a vertical resolution higher than the content 'resolution', upscale: whether or not the player can accept ads with a vertical resolution lower than the content 'resolution', and other video clip altering inputs. Said transmittal or delivery list of available video content may include standard, default, error, and alternative data for each input. Said transmittal or delivery list of available video content may include standard, default, error, and alternative responses. Said transmittal or delivery list of available video content may include standard, default, error, and alternative URL responses. Said transmittal or delivery list of available video content may include information only about the video player type, or model information. Said transmittal or delivery list of available video content may include information only about the system. Said transmittal or delivery list of available video content may be corrupt, or not include valid information. Should said transmittal or delivery list of available video content be done over the internet, then the HTTP (or other protocol) referrer information will also be available as inputs to the Ad Proxy Server.

As an example of this embodiment, the Ad Proxy Server (1204) may use some, part, or all of the data inputs; and then using business logic, determine whether to provided the requested content to the viewers primary device (1201), and if available to their second device (1206), and if so; whether to also provide video advertising to the viewers first or second screen device.

As an example of this embodiment, the Ad Proxy Server (1204) may have inputs from one or more ad servers, ad networks, or ad platforms (1202) including but not limited to availability of video advertisements; VAST requests and responses; channel, system, publisher, genre, and other identification codes; as well as location restrictions, pricing, viewer demographic targets, format, and other data inputs. Said transmittal or delivery inputs of available video advertisements may be done in a one-off fashion; on a timed basis per minute, hour, day, week, or month; in advance of known events; in advance of requests for video advertisements; concurrent with requests for advertisements; or after requests for video advertisements.

As an example of this embodiment, the Ad Proxy Server (1204) may use business logic, the inputs from the ad servers, ad networks, or ad platforms (1202), and the inputs from the web server or electronic program guide (EPG) server (1205), as well as inputs derived from third-party commercial or community sources, in combination or separately, to determine if one, some, or all of the available ad servers, ad networks, or ad platforms (1202) shall be sent a request for none, one, or multiple advertisements, along with some or all of the data available from above, destined to be displayed on the viewers first screen device (1201), second screen device (1206), or both devices.

As an example of this embodiment, the Ad Proxy Server (1204) may use business logic, data inputs, and programming scripts, to create an XML request to the ad servers, ad networks, or ad platforms (1202) requesting one or more advertisements. Said XML request may or may not be VAST compliant.

As an example of this embodiment, one or more of the ad servers, ad networks, or ad platforms (1202) may return an XML response to the Ad Proxy Server (1204) which may include attributes as to the availability, name, URL(s), duration, pricing, location and other data inputs. Said XML response may or may not be formatted in compliance with the VAST template as described above. The Ad Proxy Server (1204) may then use business logic to determine if to serve one or more of the available advertisements to the viewers first screen device, second screen device, or both; and if there are multiple advertisements available, determine which order to display some or all of said advertisements. The Ad Proxy Server (1204) may then use business logic and application programming to create a playlist consisting of none, or one or more advertisements, plus the URL of the requested content, plus additional information, and forward that playlist to the viewers first screen device, second screen device, or both. Upon completion of the viewing of the advertisement on the first screen device, the second screen device, or both; or upon initiation of viewing of the requested content; the Ad Proxy Server may then send an HTTP signal to the ad platforms indicating no advertisement was viewed, that the ad was partially viewed, or the ad(s) were completely viewed, on the first screen device, the second screen device, or both.

As a further example of this embodiment in FIG. 12, the sequence of events discussed in FIG. 6 in so far as first appearance of an ad, requirements for transcoding, and/or transrating the ad in different codecs or formats, storage of various renditions of the ad, for delivery to the first screen device and/or second screen device may also be applicable here.

As a further example of this embodiment in FIG. 12, the Ad Proxy Server (1204) may use programming to modify the HTTP or XML or other response (or request) from the ad server (1202), which may be formatted in a fashion not compatible with the VAST template, into a VAST compliant response (or request); as long as the same ad is delivered to the original requesting device(s). This is accomplished either by a) substituting a VAST compliant template with the original XML data for the non-compliant template presented, or b) substituting alternative data inputs into the VAST compliant template which will not impact the originally requested ad to the original device, or c) substituting alternative data inputs into the non-VAST compliant template which will not impact the originally requested ad to the original device, and using those inputs in a VAST compliant template.

As an additional example of this embodiment in FIG. 12, the Ad Proxy Server (1204) may use programming to modify the HTTP or XML or other response (or request) to the ad server (1202), which may be formatted in a fashion not compatible with the VAST template, into a VAST compliant response (or request); as long as the same ad server is used for delivery of the ad to the original requesting device(s). This is accomplished either by a) substituting a VAST compliant template with the original XML data for the non-compliant template presented, or b) substituting alternative data inputs into the VAST compliant template which will not impact the originally requested ad to the original device, or c) substituting alternative data inputs into the non-VAST compliant template which will not impact the originally requested ad to the original device, and using those inputs in a VAST compliant template.

The Ad Proxy Server (1204) may then use business logic and application programming to record the event(s); and/or to store the event(s) information in a database and/or logging server.

The Ad Proxy Server (1204) may then use business logic and application programming to send the event information to a third party server.

Figure 13:
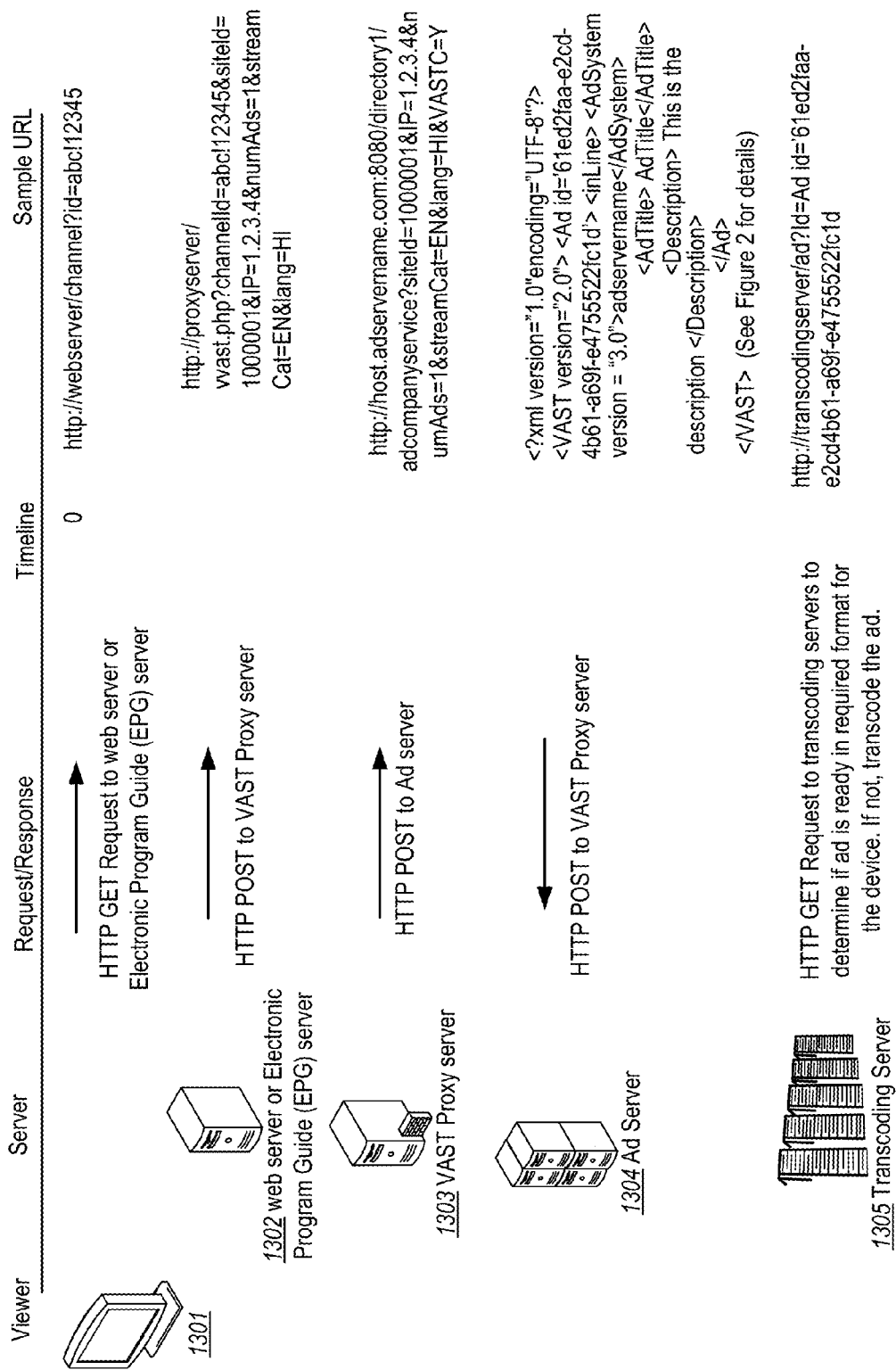
FIG. 13 is a flow chart illustrating a sample timeline of video content delivery from the viewers perspective, according to an embodiment.
Figure 13:
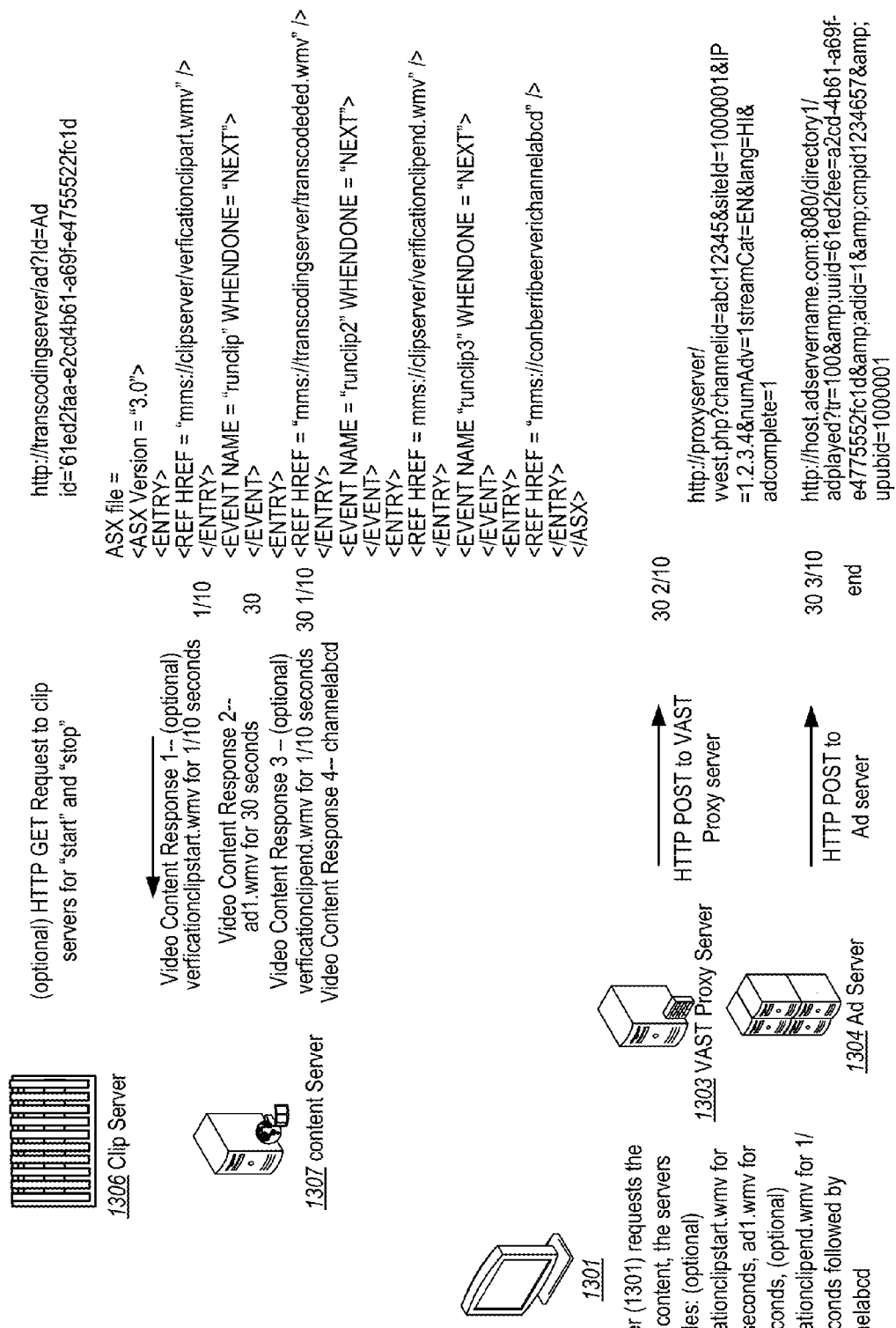

FIG. 13 is a flow diagram showing the steps to deliver video advertisements and content as illustrated in FIG. 8 along a timeline, to the viewer, according to an embodiment. Upon an HTTP request from viewers device to watch channel "ABCD" by selecting such channel from an EPG (806), the Ad Proxy Server may respond with an ASX file as illustrated in FIG. 2. Note that said request may be from a second device, such as a remote control, smart phone, tablet, etc. In accordance with the contents of the ASX file, the viewers device (801) may be presented with an ad named "ad1.wmv" at approximately time 0.2, which video may play for 15 seconds. Viewers device may then be presented "transcodedad93.mp4" from a different ad platform at approximately time 15²⁄₁₀, which video may play for 30 seconds. Finally, viewers device may be presented with the initially requested content from channel "ABCD" from Video Content Server 4 at time 45²⁄₁₀, which video may play to its completion. The VAST ad server will then post an HTTP completion response to both ad servers, at approximately time 45³⁄₁₀. In some embodiments, information about the advertisements and content may be recorded in a log file. In some embodiments, the log files may be transferred to the Log Server for processing and reporting purposes.

Figure 14:
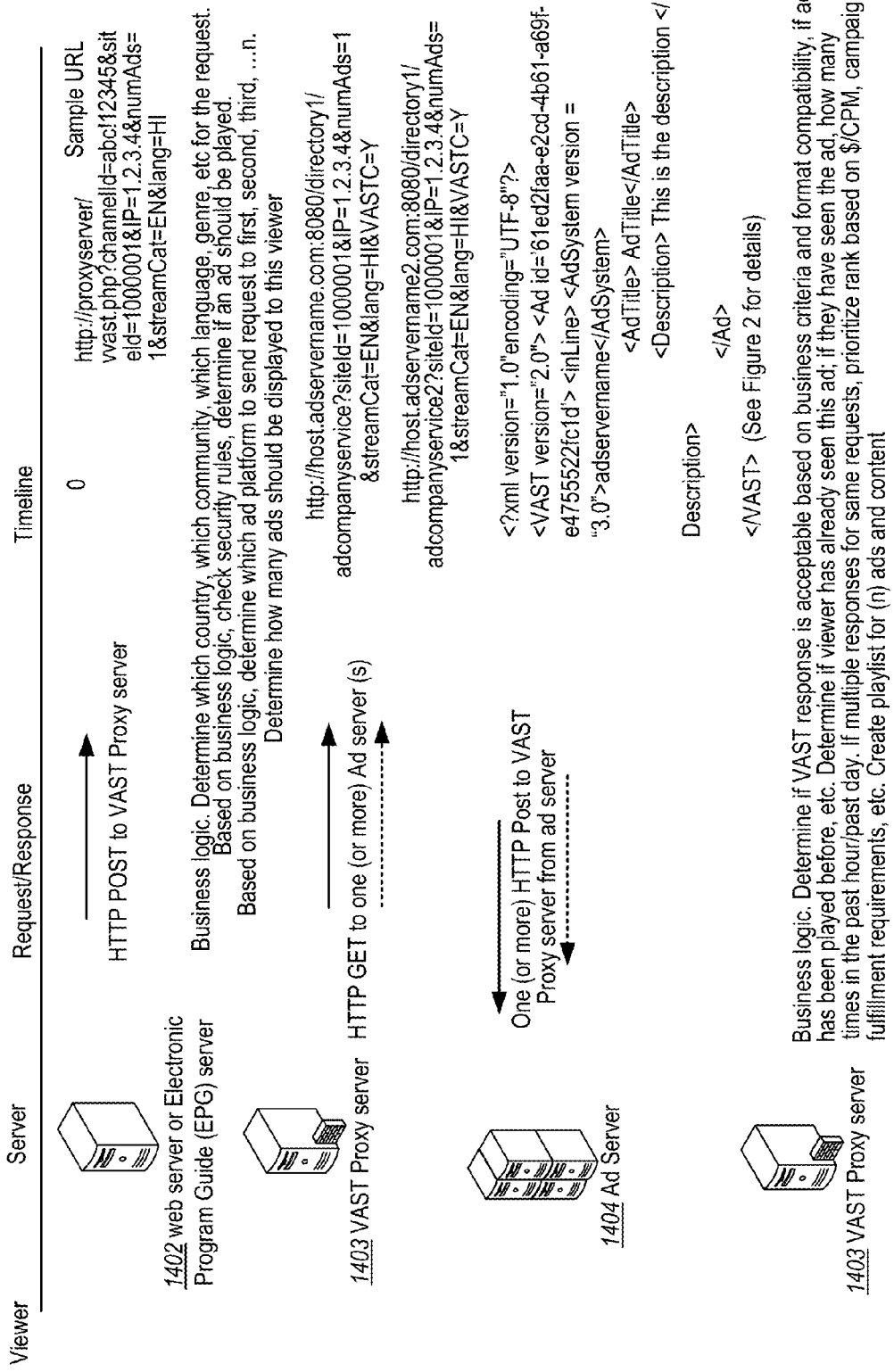
FIG. 14 is a flow chart illustrating a sample timeline of video content delivery from the perspective of one or more ad servers, according to an embodiment.
Figure 14:
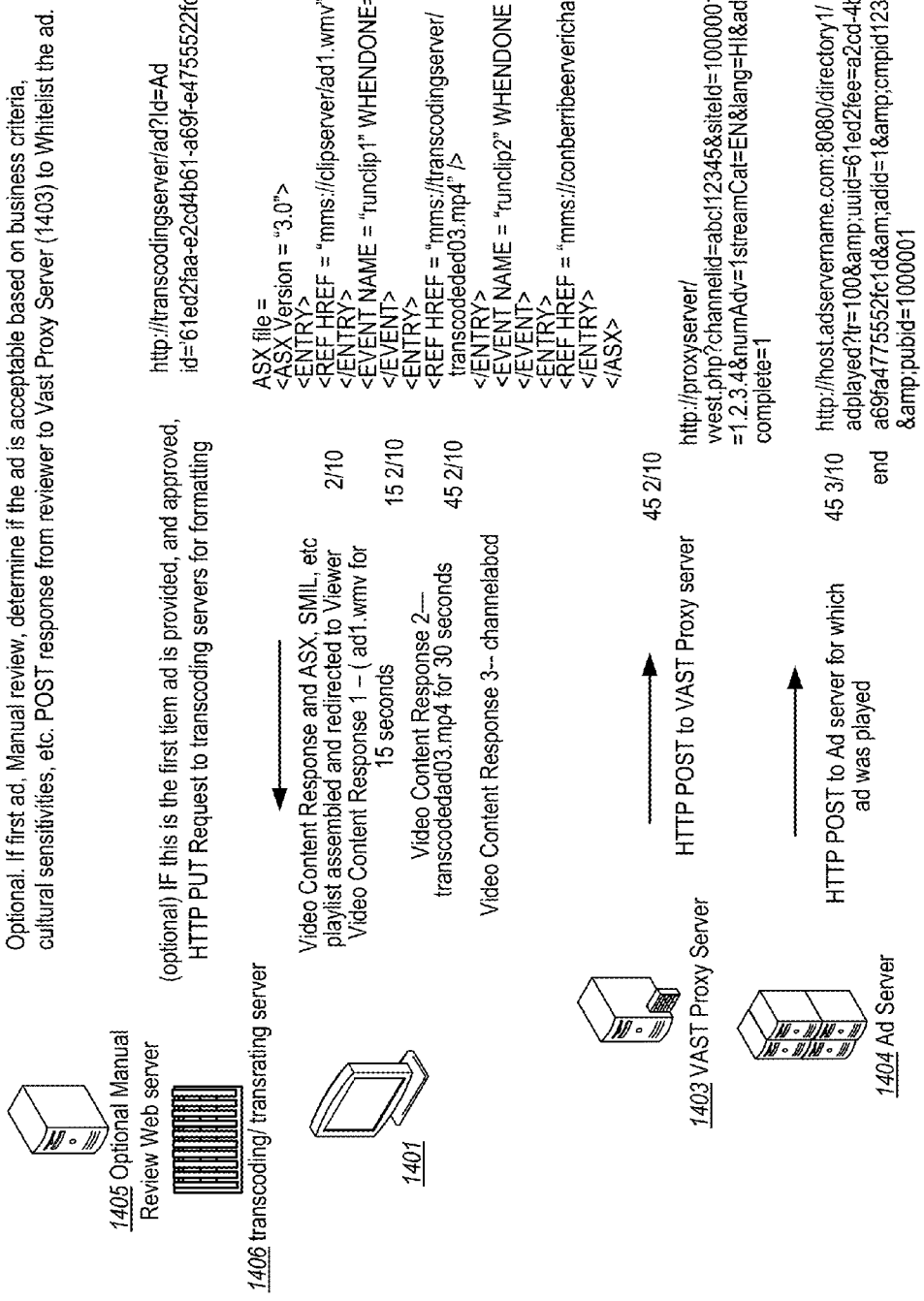
Figure 15:
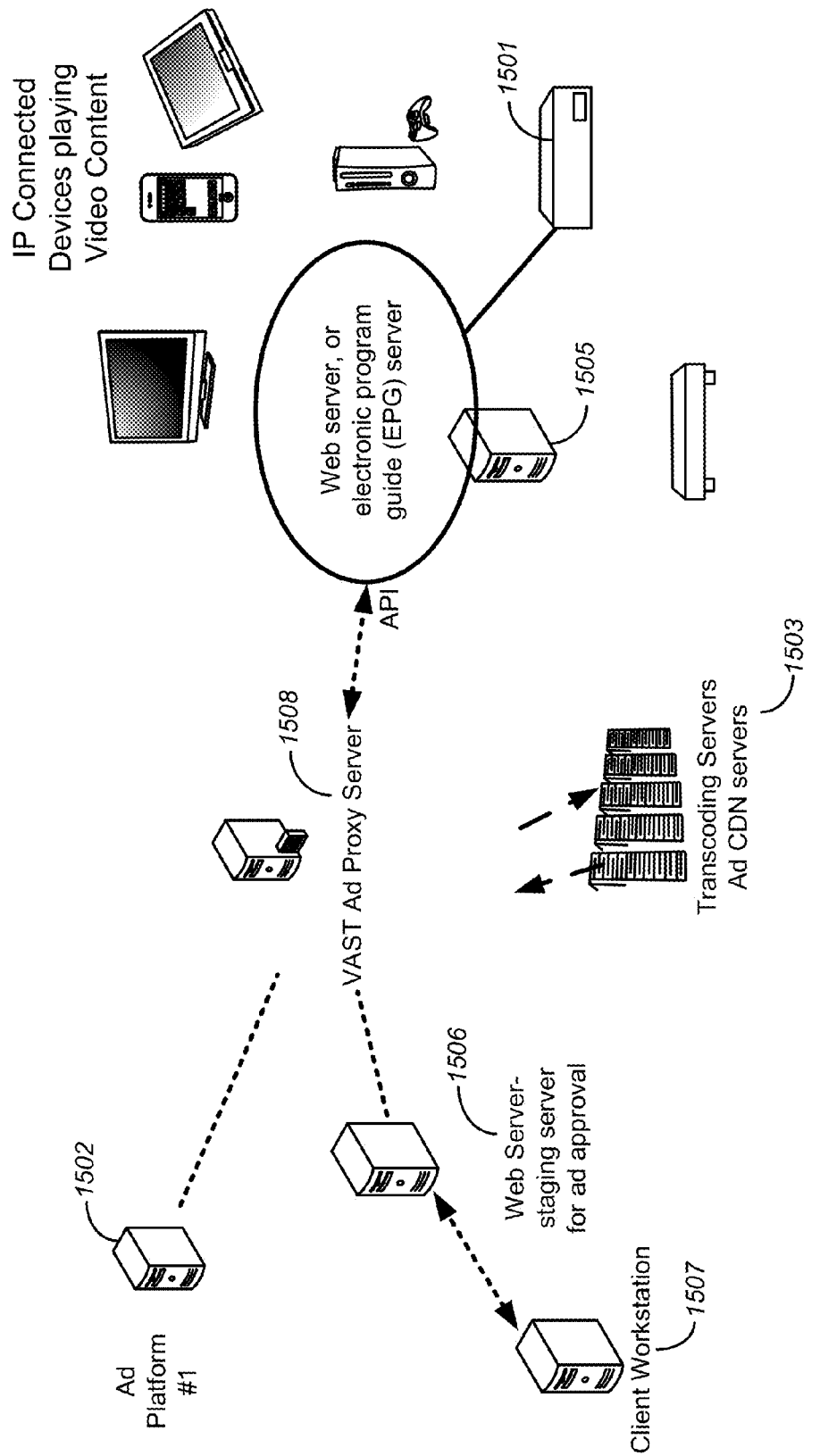
FIG. 15 is a block diagram illustrating computer hardware and computer systems usable for implementing the systems and methods described herein, with an ad server, and IP connected devices, with API connectivity between the web server or electronic program guide (EPG) server and the Ad Proxy Server, transcoding/transrating servers, and a separate web server used for manual approval of the ads.

FIG. 14 is a flow diagram showing the steps to deliver video advertisements and content as illustrated in FIG. 8 along a timeline, demonstrating calls and responses from the electronic program guide server (806) to the Ad Proxy Server (804) to multiple ad servers, ad platforms, and/or ad networks (802) according to an embodiment. Upon an HTTP request from viewers device to the electronic program guide server (806), said request is forwarded (redirected) to the Ad Proxy Server (804) which may include additional optional HTTP, user, or other information, to watch channel "ABCD". By selecting such channel from an EPG (806), the Ad Proxy Server (804) may enact business logic, including but not limited to security, location, ethnic community, language, content genre, device UID/GUID, device user agent, HTTP referrer properties, date, day of month, time of day, availability of content, availability of advertisements from specific sources, and other inputs, the Ad Proxy Server (804) may respond with a determination as to whether to serve an advertisement and/or content. The Ad Proxy Server (804) may also enact subroutines that determine request time, and start a counter to terminate the following requests and either not return content to the viewers device; or to return content to the viewers device without an advertisement. Upon determination to serve an ad to the viewer, the Ad Proxy Server (804) will then determine if more then one ad is to be served, and if so, repeat the following processes until the total number of ad requests are fulfilled. The Ad Proxy Server (804) may then submit singular or multiple HTTP 'get' requests to a deterministic quantity of ad servers, ad platforms, and/or ad networks (802), singularly, in serial process, or in parallel process. Alternatively, the Ad Proxy Server (804) may then submit HTTP 'get' requests to a single ad servers (802), singularly. One or more ad servers, ad platforms, and/or ad networks (802) may respond to the HTTP requests. Using business logic, the Ad Proxy Server (804) may then determine if the response is acceptable based on business criteria, including but not limited to response format, ad type and ad format, if the ad has been played before, if the viewer has already seen the ad, how many times or how often the viewer has seen the ad, and other business criteria or inputs. Using business logic, the Ad Proxy Server (804) may then prioritize the responses, ranking the ads based on inputs including but not limited to ad value ($/CPM, etc) campaign fulfillment requirements, and other inputs. The Ad Proxy Server (804) may then create a playlist in an appropriate language for the device, such as ASX or SMIL. Optionally, if this is the first time the ad has entered the system, the Ad Proxy Server (804) may use business logic to not serve the ad, until the ad has been manually reviewed. The manual review of the ad may be performed from an optional manual review web server (1401). Said manual review shall use deterministics including but not limited to business criteria, competitive information, cultural sensitivities, and other criteria. Optionally, if this is the first time the ad has entered the system, the Ad Proxy Server (804) may use business logic to not serve the ad, until the ad has been transcoded and/or transrated using a transcoding/transrating server (1406). The transcoding and/or transrating of the ad will change the ad file format to different formats, appropriate for delivery to multiple IP connected devices. (801). Concurrently, the Ad Proxy Server (804) may create an ASX file as illustrated in FIG. 2. In accordance with the contents of the ASX file, the viewers device (801) may be presented with an ad named "ad1.wmv" at approximately time 0.2, which video may play for 15 seconds. Viewers device may then be presented with a second ad "transcodedad93.mp4" from a different ad platform at approximately time 15$\frac{2}{10}$, which video advertisement may play for 30 seconds. Finally, viewers device may be presented with the initially requested content from channel "ABCD" from a separate video content server at time 45$\frac{2}{10}$, which video may play to its completion. The VAST ad server will then post an HTTP completion response to both ad servers, at approximately time 45$\frac{3}{10}$. In some embodiments, information about the advertisements and content may be recorded in a log file. In some embodiments, the log files may be transferred to the Log Server for processing and reporting purposes.

The systems and methods described herein may be used for a variety of uses and applications in which verification of content delivery is desirable. For example, the systems and methods described herein may be used to provide verification to third party advertisers who wish to distribute video advertisements in connection with other video content over the Internet. In some embodiments, a VAST proxy ad Server may automatically include an advertisement with a request for other video content, and may include Start Verification Clip and End Verification Clip in a playlist transmitted to a user's device for purposes of verifying delivery of the advertisement.

Figure 16:
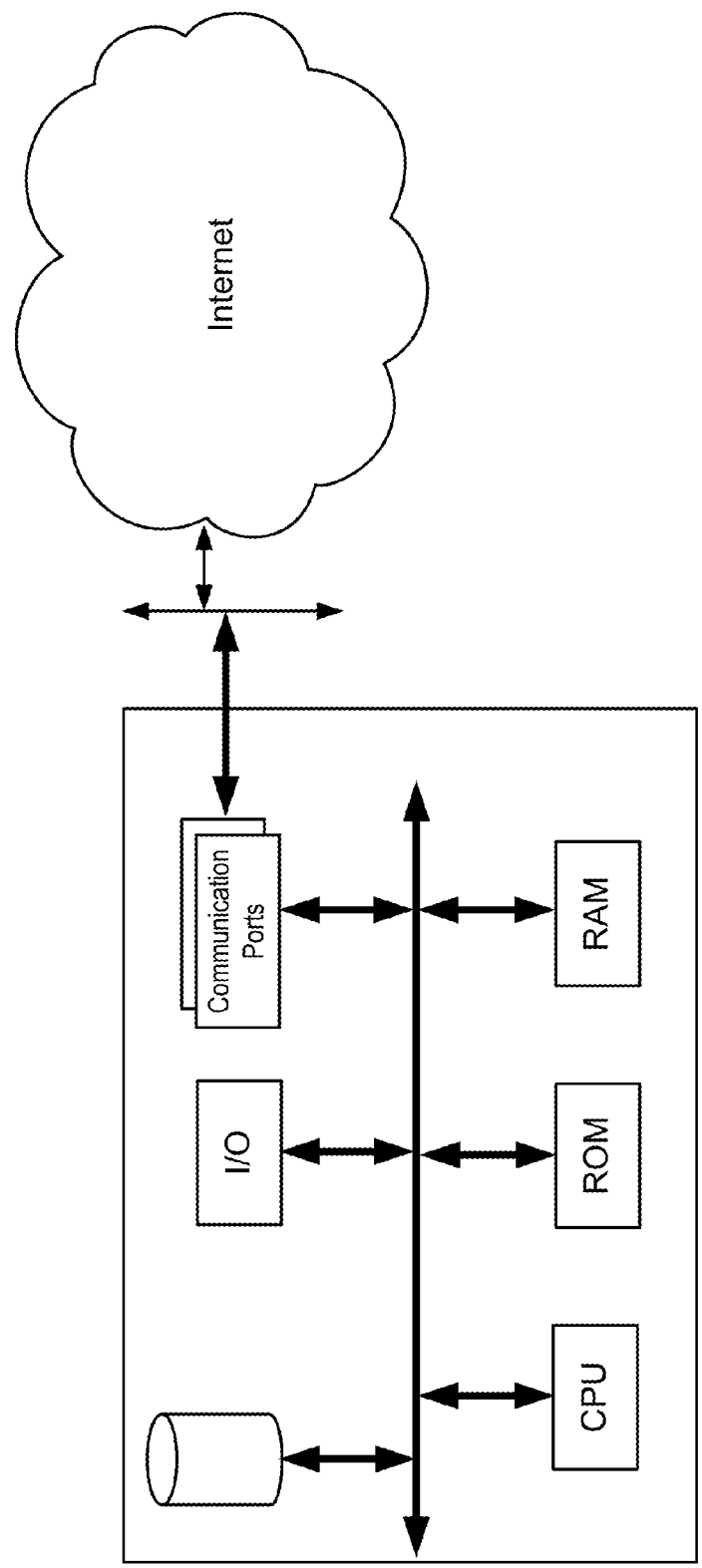
FIGS. 16 and 17 are block diagrams illustrating computer hardware and computer systems usable for implementing the systems and methods described herein.
Figure 17:
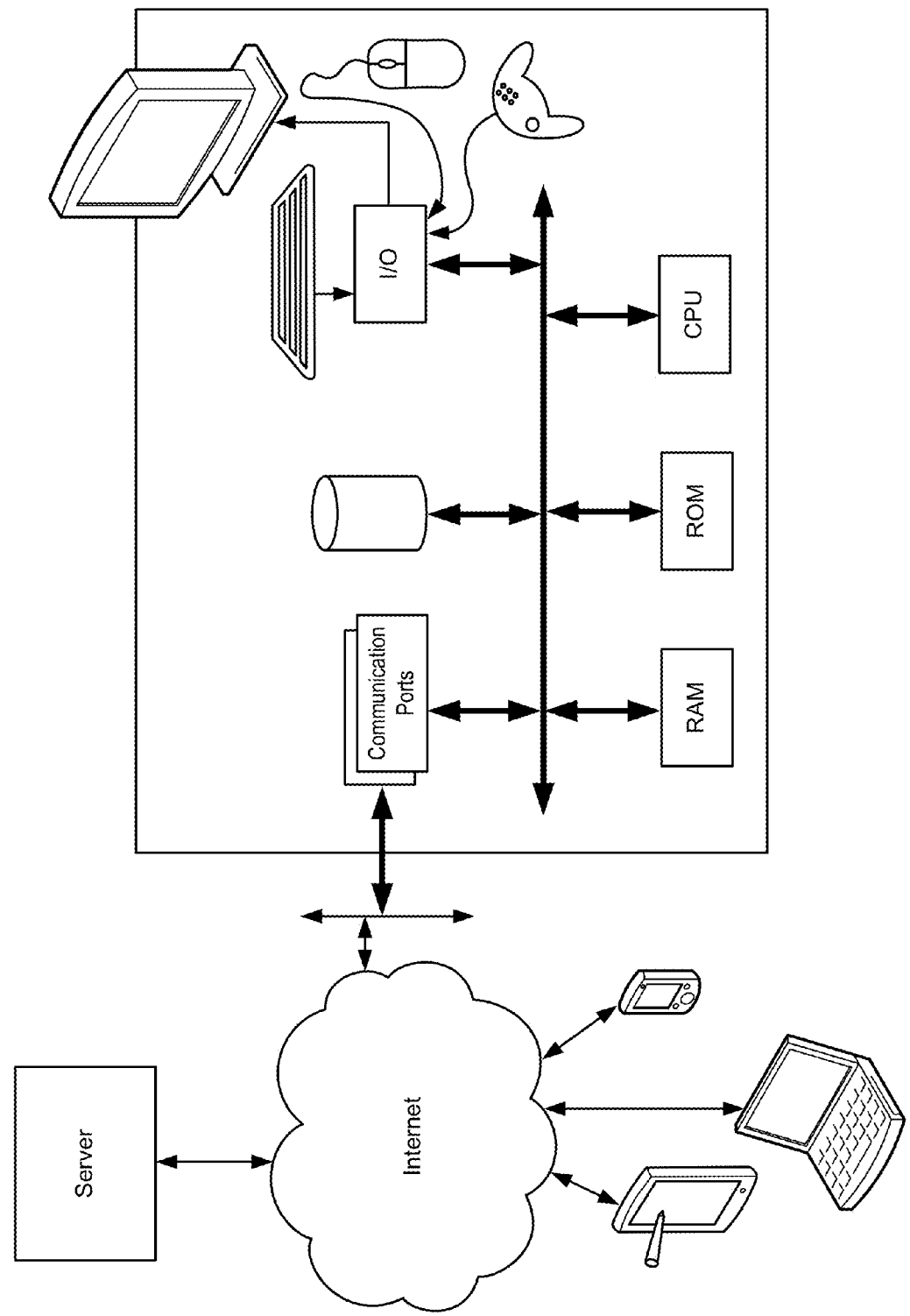

The systems and methods described herein may be implemented in or upon computer systems, such as the computer systems shown in FIGS. 16 and 17. For example, the system shown in FIG. 1 may be implemented in or upon such computer systems. Such computer systems may include various combinations of central processor or other processing device, an internal communication bus, various types of memory or storage media (RAM, ROM, EEPROM, cache memory, disk drives etc.) for code and data storage, and one or more network interface cards or ports for communication purposes. The systems and methods described herein may include or be implemented in software code, which may run on such computer systems or other systems. For example, the software code may be executable by a computer system, for example, that functions as the storage server or proxy server, and/or that functions as a user's terminal device. During operation the code may be stored within the computer system. At other times, the code may be stored at other locations and/or transmitted for loading into the appropriate computer system. Execution of the code by a processor of the computer system may enable the computer system to implement the methods and systems described herein.

FIGS. 16 and 17 provide examples of functional block diagram illustrations of computer hardware platforms, in or upon which systems and methods described herein may be implemented (for example the system of FIG. 1). FIG. 16 shows an example of a network or host computer platform, as may be used to implement a server, according to an embodiment. FIG. 17 shows a computer with user interface elements, as may be used to implement a personal computer or other type of work station or terminal device according to an embodiment, although the computer of FIG. 17 may also act as a server depending on its configuration. The computer system of FIG. 17 may communicate with other systems through a computer network. For example, computer system of FIG. 17 may communicate with the server shown or other systems or servers. The computer system of FIG. 17 may communicate with various other devices such as personal computers, tablet computers, personal digital assistants, mobile telephones and other systems. The systems and methods described herein may be implemented in or upon such computer hardware platforms in whole, in part, or in combination. For example, aspects of the systems and methods described herein involving transmission or other sharing of data between systems may be implemented on systems such as the server of FIG. 16 and the server and computer combination of FIG. 17. The systems and methods described herein, however, are not limited to use in such systems and may be implemented or used in connection with other systems, hardware or architectures. The methods described herein may be implemented in computer software that may be stored in the computer systems and servers described herein.

A computer system or server, according to various embodiments, may include a data communication interface for packet data communication. The computer system or server may also include a central processing unit (CPU), in the form of one or more processors, for executing program instructions. The computer system or server may include an internal communication bus, program storage and data storage for various data files to be processed and/or communicated by the server, although the computer system or server may receive programming and data via network communications. The computer system or server may include various hardware elements, operating systems and programming languages. The server or computing functions may be implemented in various distributed fashions, such as on a number of similar or other platforms.

The computer system may also include input and output (I/O) devices such as a mouse, game input device or controller, display, touch screen or other I/O device or devices in various combinations.

The methods described herein may be implemented in mobile devices such as mobile phones, mobile tablets and other mobile devices with various communication capabilities including wireless communications, which may include radio frequency transmission infrared transmission or other communication technology. Thus, the hardware described herein may include transmitters and receivers for radio and/or other communication technology and/or interfaces to couple to and communication with communication networks.

The methods described herein may be implemented in computer software that may be stored in the computer systems including a plurality of computer systems and servers. These may be coupled over computer networks including the Internet. Accordingly, an embodiment includes a network including the various system and devices coupled with the network.

Further, various methods and architectures as described herein, such as the various processes described herein or other processes or architectures, may be implemented in resources including computer software such as computer executable code embodied in a computer readable medium, or in electrical circuitry, or in combinations of computer software and electronic circuitry.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description herein. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any one or more of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the claims, the terms used should not be construed to limit the systems and methods to the specific embodiments disclosed in the specification and the claims, but should be construed to include all processing systems that operate under the claims.

While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods.

The various features described above may be combined in various combinations. Without limitation, features described may be combined with various systems, methods and products described. Without limitation, multiple dependent claims may be made based on the description herein.

While embodiments of the invention have been shown and described herein, those skilled in the art will appreciate that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A method of delivering video content, comprising:
receiving a request for a first video from a video-playing device that is coupled to a network;
determining a device type and a video player capability of the video playing device;
selecting a first video content server based on attributes of the request for the first video from the video-playing device and attributes of the video-playing device, wherein the first video content server is capable of transmitting the first video;

selecting a second video to be played with the first video, wherein the second video comprises a video advertisement;

transmitting a request for the second video to an advertising network server, wherein the advertising network server is capable of transmitting the second video;

receiving a response from the advertising network server identifying a video advertisement as the second video;

generating a playlist listing a reference to the first video to be requested from the first video content server and a reference to the second video to be requested from the advertising network server, said playlist further including a start verification video clip and an end verification video clip; and transmitting the playlist to the video-playing device.

2. The method of claim 1, further comprising:

receiving a request for the second video from the video-playing device;

transforming the request into a request compliant with the Video Ad Serving Template (VAST) protocol and capable of being received by an advertising network, wherein the request from the video-playing device is noncompliant with the VAST protocol;

transmitting the transformed request compliant with the VAST protocol to the advertising network server;

receiving a response from the advertising network server; and transmitting to the video-playing device the response from the advertising network server.

3. The method of claim 2, further comprising translating the response from the advertising network server to be compliant with the device type of the video-playing device.

4. The method of claim 2, wherein video content associated with the response transmitted to the video-playing device is transcoded based on attributes associated with the video-playing device and attributes associated with the video content.

5. The method of claim 4, wherein the transcoding of the video content determines the best protocol, bit rate, and frame size for delivery of the video content to the video-playing device based on a user agent of the video-playing device.

6. The method of claim 1, further comprising:

receiving a request for the second video from the video-playing device;

transmitting the request for the second video to the advertising network server;

receiving a response from the advertising network server;

transforming the response from the advertising network service into a response compliant with the VAST protocol, wherein the response from the advertising network server is non-compliant with the VAST protocol; and transmitting to the video-playing device the transformed response compliant with the VAST protocol.

7. The method of claim 1, wherein the playlist comprises an ordered listing of a plurality of video content tags, wherein each video content tag identifies an item of video content and a video content server from which the video content may be requested by the video-playing device, and wherein video content is not stored within the playlist.

8. The method of claim 1, further comprising:

recording a log of the sequence of videos requested from the play list; and determining whether the second video has been accessed based on the play time duration from the log recorded of the request for the first verification video clip and the log recorded of the request for the second verification video clip.

9. The method of claim 8, wherein a verification video comprises a remote data file that is capable of being accessed by the video-playing device, wherein the remote data file is capable of being process by another video-playing device.

10. The method of claim 8, wherein the determining comprises comparing the play time duration of the second video to a duration attribute associated with a VAST-compliant response for the second video and further determining whether the play time duration is within an allowable variance.

11. The method of claim 10, further comprising transmitting a VAST-compliant notification to the advertising network server associated with the second video indicating that the second video was accessed in full by the video-playing device.

12. A method of delivering video content, comprising:

receiving a plurality of requests for a first video from a plurality of video-playing devices, wherein each video-playing device is coupled to a network;

determining a device type and a video player capability for each of the plurality of video-playing devices;

selecting a first video content server based on attributes of each of the plurality of requests, wherein the first video content server is capable of transmitting the first video;

selecting a relevant second video to be played with the first video for each of the plurality of video-playing devices;

generating a play list for each of the plurality of video-playing devices listing a reference to the first video to be requested from the first video content server and a reference to the second video to be requested from a second video content provider, said playlist further including a start verification video clip and an end verification video clip; and transmitting the play list to each of the plurality of video-playing devices.

13. The method of claim 12, wherein the second video comprises a video advertisement and the second video content provider is an advertising network.

14. The method of claim 13, further comprising:

transmitting to the advertising network a request for the advertising video for each of the plurality of video-playing devices;

receiving a plurality of responses corresponding to the respective requests each request to the advertising network for the advertising video, wherein the each of the plurality of responses from the advertising network identifies the advertising video selected for playback with the first video for each of the plurality of video-playing devices.

15. The method of claim 13, wherein:

at least one of the plurality of video-playing devices is VAST-compliant; and at least one of the plurality of video-playing devices is not VAST-compliant.

16. A system for delivering video content, said system comprising:

a processor;

storage;

a computer-readable medium encoded with an operating system, a logging module, and a scripting engine for execution by said processor;

one or more network interfaces capable of communicating with a plurality of video advertising networks; and wherein said scripting engine contains logic for executing the steps of:
  receiving a request for a first video from a video-playing device that is coupled to a network;
  determining a device type and a video player capability of the video-playing device;
  selecting a first video content server based on attributes of the request for a first video from the video-playing device and attributes of the video-playing device, wherein the first video content server is capable of transmitting the first video;
  selecting a second video to be played with the first video, wherein the second video comprises a video advertisement;
  transmitting a request for the second video to an advertising network server;
  receiving a response from the advertising network server identifying a video advertisement as the second video;
  generating a playlist listing a reference to the first video to be requested from the first video content server and a reference to the second video to be requested from the advertising network server, said playlist further including a start verification video clip and an end verification video clip; and
  transmitting the playlist to the video-playing device.

17. The system of claim 16, further comprising:
receiving a request for the second video from the video-playing device;
transforming the request into a request compliant with the Video Ad Serving Template (VAST) protocol and capable of being received by an advertising platform, wherein the request from the video-playing device is noncompliant with the VAST protocol transmitting the transformed request to the advertising network server;
receiving a response from the advertising network server; and
transmitting the response to the video-playing device.

18. The system of claim 17, further comprising translating the response from the advertising network server to be compliant with the device type of the video-playing device.

19. The system of claim 17, wherein the transforming the request includes inserting into the translated request one or more of the following:
  an XML tag to identify an IP address of the video-playing device;
  an XML tag to identify a user agent of the video-playing device;
  an XML tag to identify the content type requested of the video-playing device, wherein the content is the language, genre, or rating;
  an XML tag to identify additional data fields unique to the video-playing device; and
  an XML tag to identify additional data fields unique to the video content requested by the video-playing device.

20. The system of claim 17, further comprising:
determining that an advertisement from the advertising network server is not available;
generating an alternate server response that mimics a response from the advertising network server and indicates that no advertisement is available; and
transmitting the alternate server response to the video-playing device.

* * * * *